(12) United States Patent
Tanaka et al.

(10) Patent No.: US 7,461,300 B2
(45) Date of Patent: Dec. 2, 2008

(54) IMAGE FORMING APPARATUS AND COMMUNICATION DATA HANDLING METHOD THEREIN

(75) Inventors: Hiroshi Tanaka, Nagano-ken (JP);
Kanehiro Machiya, Nagano-ken (JP);
Hironori Sakaguchi, Nagano-ken (JP);
Koji Matsubara, Nagano-ken (JP);
Kazuhiro Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 476 days.

(21) Appl. No.: 11/387,148

(22) Filed: Mar. 21, 2006

(65) Prior Publication Data

US 2006/0218431 A1 Sep. 28, 2006

(30) Foreign Application Priority Data

Mar. 23, 2005 (JP) ............................. 2005-084146
Mar. 23, 2005 (JP) ............................. 2005-084147
Apr. 28, 2005 (JP) ............................. 2005-132709

(51) Int. Cl.
*G06F 11/00* (2006.01)
(52) U.S. Cl. .............................. 714/43; 714/21; 710/52
(58) Field of Classification Search ........................ None
See application file for complete search history.

(56) References Cited

U.S. PATENT DOCUMENTS

| 3,956,589 | A | * | 5/1976 | Weathers et al. ............. 370/296 |
|---|---|---|---|---|
| 5,003,538 | A | * | 3/1991 | Lee et al. ...................... 714/748 |
| 5,210,867 | A | * | 5/1993 | Barlow et al. .................. 714/17 |
| 5,566,315 | A | * | 10/1996 | Milillo et al. ................. 711/113 |
| 5,652,916 | A | * | 7/1997 | Murakami et al. ............. 710/52 |
| 5,938,786 | A | * | 8/1999 | Gregg ........................ 714/748 |
| 6,012,106 | A | * | 1/2000 | Schumann et al. ............ 710/22 |
| 6,633,873 | B1 | * | 10/2003 | Nakamura .................... 707/10 |
| 7,079,489 | B2 | * | 7/2006 | Massie et al. ............... 370/236 |
| 2003/0002609 | A1 | * | 1/2003 | Faller et al. ................. 375/372 |
| 2005/0015648 | A1 | * | 1/2005 | Tawada et al. .................. 714/5 |
| 2005/0105921 | A1 | | 5/2005 | Yoshizuka et al. |
| 2006/0085680 | A1 | * | 4/2006 | Matsuno et al. ............... 714/17 |

* cited by examiner

*Primary Examiner*—Gabriel L Chu
(74) *Attorney, Agent, or Firm*—Hogan & Hartson LLP

(57) ABSTRACT

The present invention aims at avoiding a hung-up in the case where a command is sent from a controller within a printer but there is no response to the command from the unit side within the printer, due to a faulty communication or the like, and also in the case where a noise is introduced in the communication data. In the present invention, based on a command sent to the unit side, a data amount of a response from the unit side to this command is predicted, and also a threshold value of response time is provided (S21), which is the time when from the command is sent until the time when the response is received. After the command is sent (S23) until the threshold value of the response time elapses, the receive data is sequentially stored in the receive buffer up to when the data amount from the unit side reaches the predicted data amount (S28, 32, 34). If the data amount from the unit side does not reach the predicted amount even after the lapse of threshold value of the response time, an error processing is executed (S43, 45, 47).

28 Claims, 16 Drawing Sheets

FIG. 7

| ADDRESS | INFORMATION CONTENT (8 BITS) |
|---|---|
| 00H | ID INFORMATION |
| 01H | MANUFACTURING DATE |
| 02H | DESTINATION |
| 03H | MANUFACTURING LINE |
| 04H | COMPATIBLE MODELS |
| 05H | TONER REMAINING AMOUNT |
| ⋮ | ⋮ |

FIG. 8

| ADDRESS | INFORMATION CONTENT (8 BITS) |
|---|---|
| 00H | ID INFORMATION |
| 01H | MANUFACTURING DATE |
| 02H | DESTINATION |
| 03H | MANUFACTURING LINE |
| 04H | COMPATIBLE MODELS |
| 05H | NUMBER OF SHEETS PRINTED BY MAIN UNIT WHEN USAGE STARTS |
| 06H | NUMBER OF SHEETS PRINTED BY MAIN UNIT WHEN USAGE ENDS |
| 07H | NUMBER OF SHEETS PRINTED IN COLOR |
| 08H | NUMBER OF SHEETS PRINTED IN MONOCHROME |
| ⋮ | ⋮ |

READ COMMAND

READ RESPONSE

WRITE COMMAND

WRITE RESPONSE

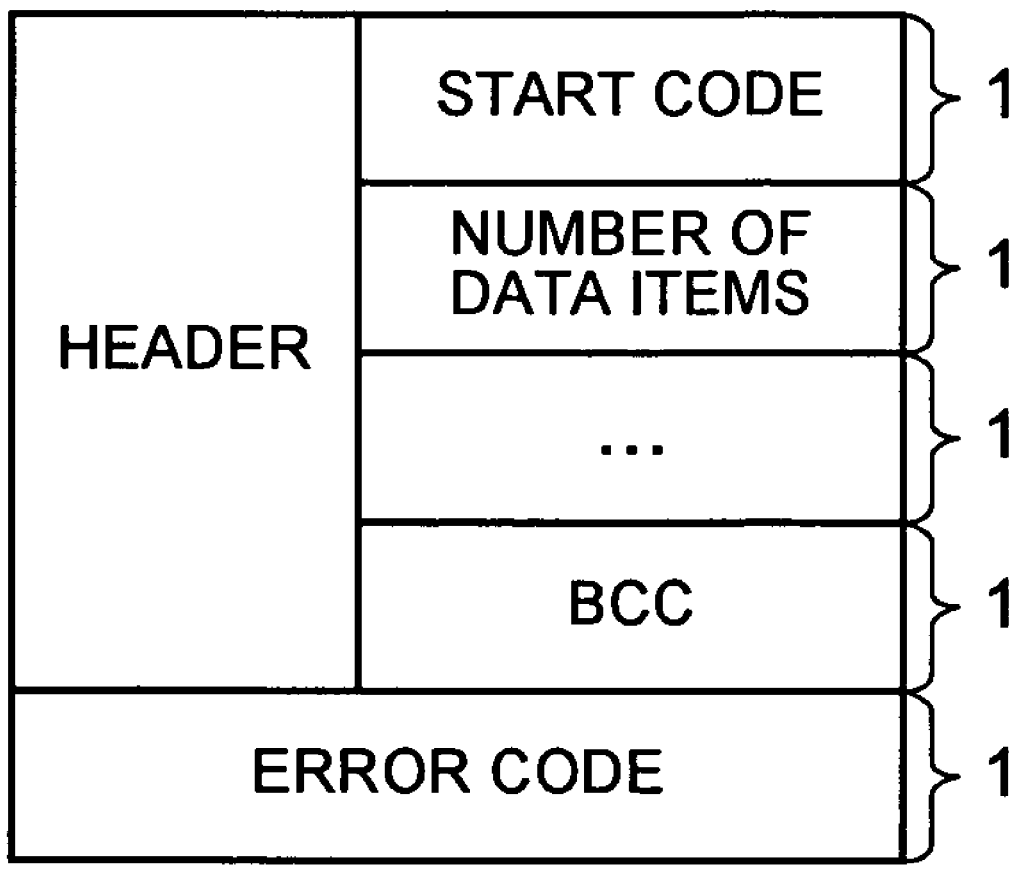

DEVELOPING POSITION (OPPOSED POSITION)

ATTACH/DETACH POSITION (UNLOADING POSITION)

HOME POSITION

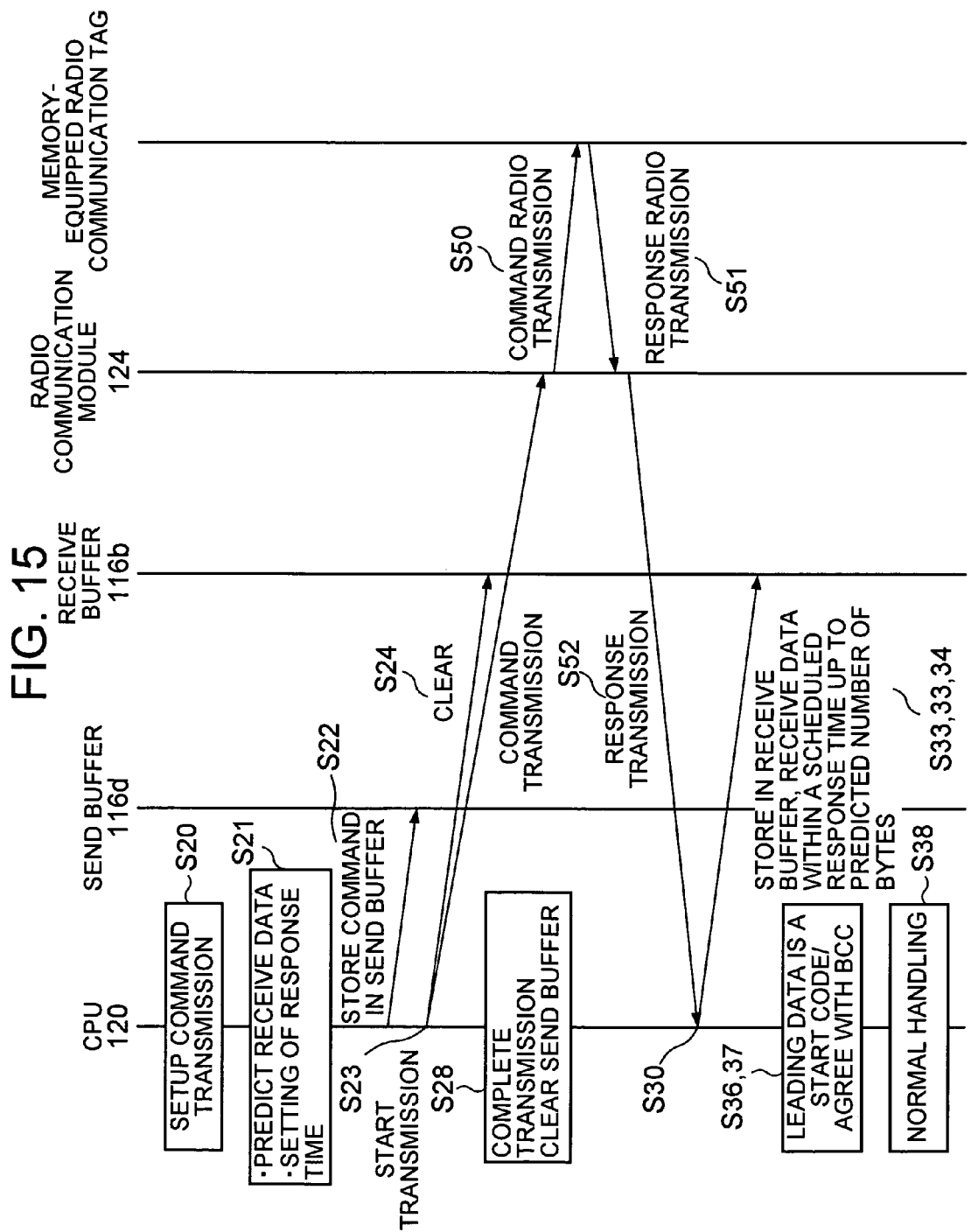

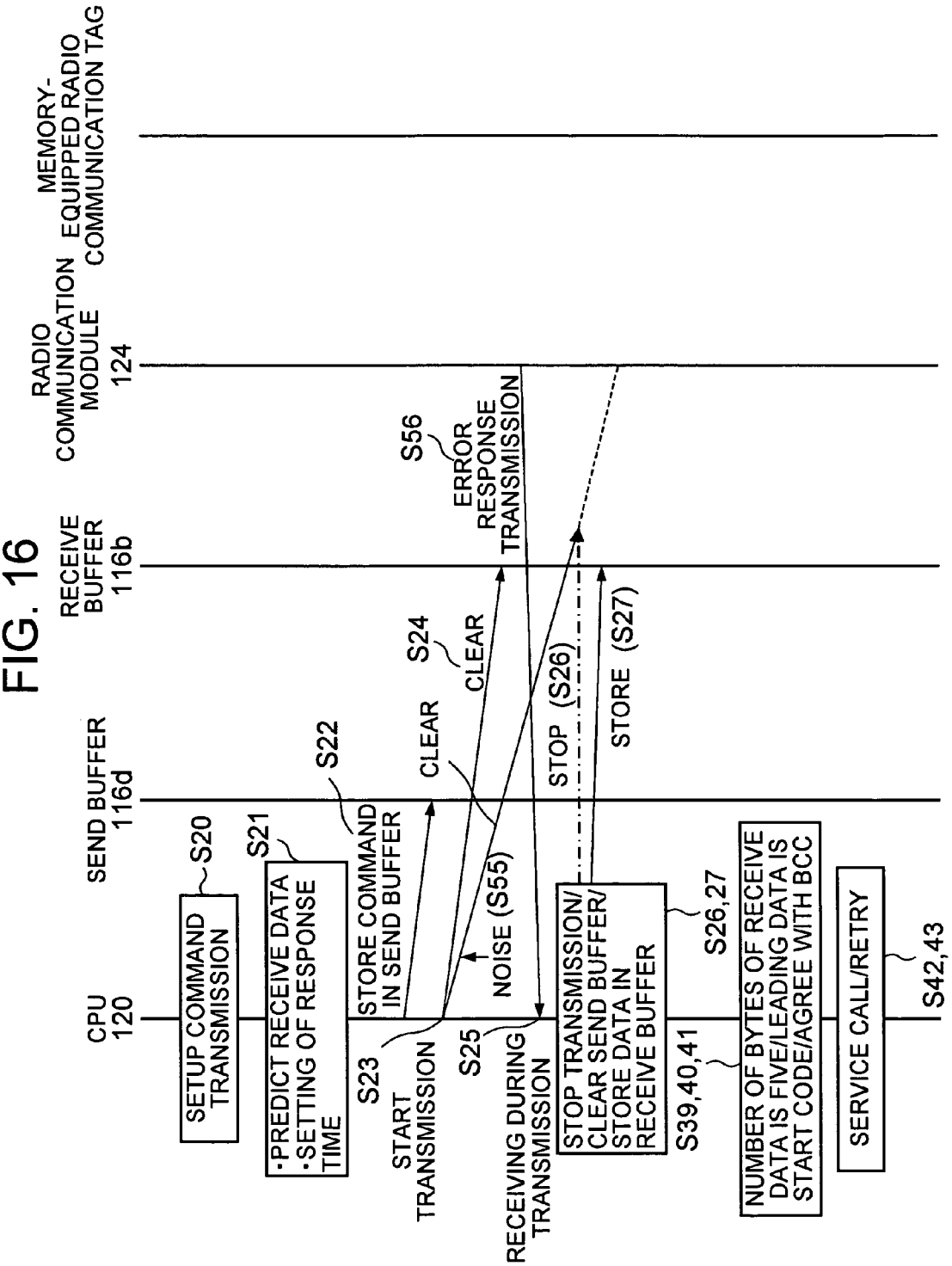

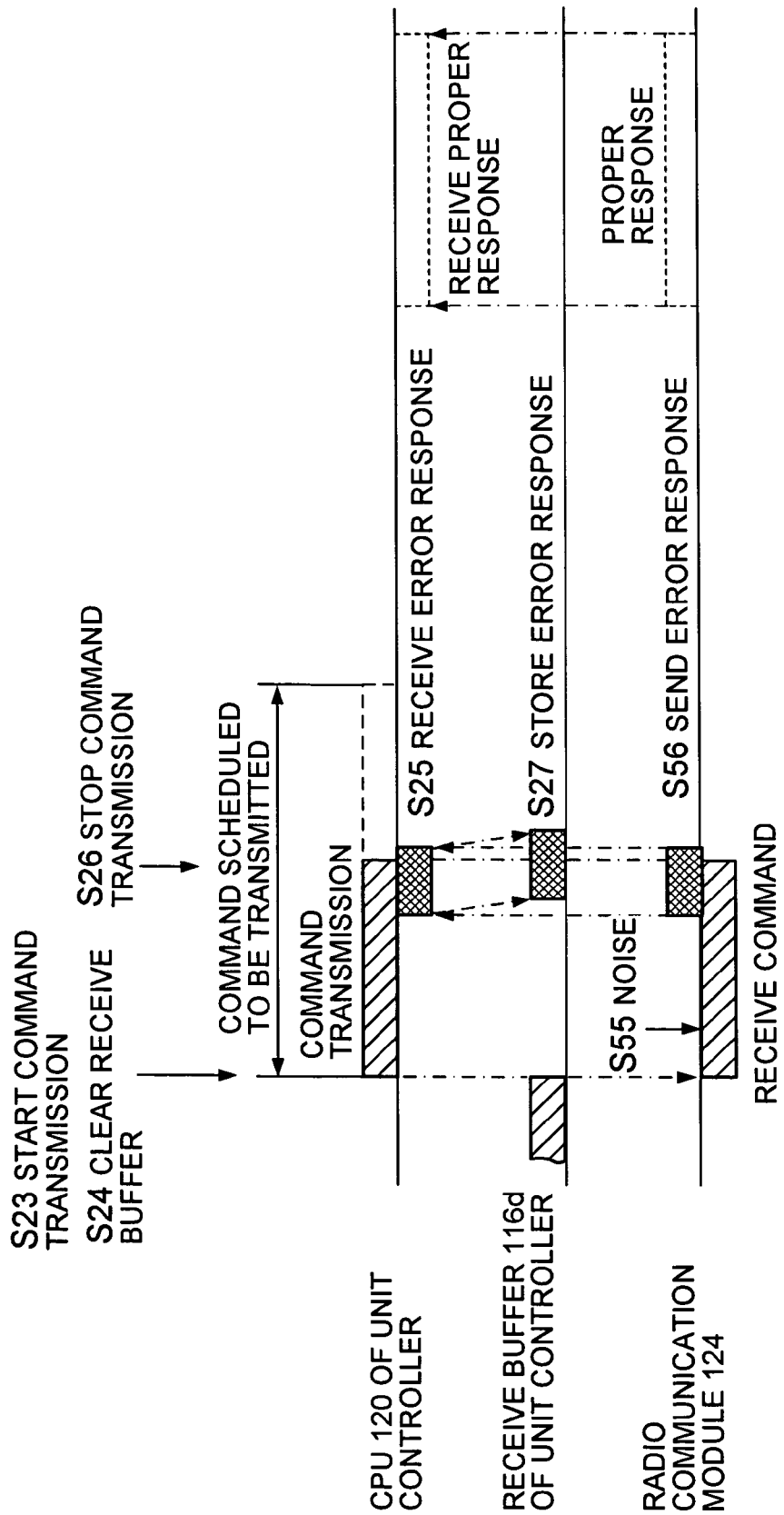

IMAGE FORMING APPARATUS AND COMMUNICATION DATA HANDLING METHOD THEREIN

The entire disclosure Japanese Patent Application No. 2005-84147, filed Mar. 23, 2005 is expressly incorporated by reference herein.

TECHNICAL FIELD

The present invention relates to an image forming apparatus provided with a unit such as a developing unit, and a controller which controls the unit, wherein the apparatus performs data sending and receiving between the unit and the controller, and the present invention also relates to a method for handling communication data inside the apparatus.

BACKGROUND OF THE INVENTION

As a way of example, WO 03/087952 A1 discloses one type of conventional image forming apparatus.

This image forming apparatus disclosed in the above document is a color laser beam printer, and it is provided with a photoconductor unit, multiple developing units which execute developing procedure with respective colors, a transfer unit, and the like, and a controller which controls those elements.

Each of the multiple developing units is stopped temporarily to be opposed to a photoconductor of the photoconductor unit, and forms a toner image of each color on the photoconductor. Therefore, those multiple developing units repeat rotation and halt integrally. In this image forming apparatus, radio communication tags each having a memory are installed on the developing units respectively, so that the developing units thus rotating and the controller are allowed to exchange data via communications. In addition, wired connection is established between the controller and a radio communication module. Since the controller manages the toner amount within each developing unit, the controller communicates with the radio communication tag on each developing unit via the radio communication module, and writes the toner remaining amount data into the memory installed on the radio communication tag.

However, in the conventional image forming apparatus, if a noise is introduced in the communication data between the controller and the unit, and data amount from the unit side is increased, and thus a receive buffer of the controller has to store unexpected volume of data. Therefore, a problem of hung-up may occur.

In addition, in the conventional image forming apparatus, there is also a problem of hung-up, for example, even when the controller sends a command to the unit side, the controller is not capable of receiving a response to the command, in the case where the controller and the radio communication module are disconnected, or in the case where the radio communication module suffers a breakdown.

Furthermore, in the conventional image forming apparatus, when the controller and the radio communication module are temporarily disconnected, or when a breakdown occurs in a part of the radio communication module, an abnormal response is sent from the radio communication module to the controller, announcing the occurrence of abnormality, in the middle of sending a command from the controller to the unit side. In cases like this, the controller is capable of handling such situation by performing command retransmission or the like, i.e., retry or the like, after a lapse of predetermined period of time from the end of the command transmission.

However, in the conventional image forming apparatus, a communication available time zone is short, during when the radio communication tag installed on each of the developing units of respective colors and the radio communication module are opposed to each other. Therefore, if the controller tries to perform a retry after a lapse of predetermined period of time from the end of the command transmission, there occurs a problem that the number of retrying counts is extremely limited.

SUMMARY OF THE INVENTION

Considering the above situation, a first object of the present invention is to provide an image forming apparatus which is capable of avoiding hung-up even when a noise is introduced in the communication data exchanged between the controller and the unit, and a method for handling the communication data inside the apparatus.

A second object of the present invention is to provide an image forming apparatus which is capable of avoiding hung-up, even when the controller and the radio communication module are disconnected or the radio communication module suffers a breakdown, and a method for handling the communication data inside the apparatus.

A third object of the present invention is to provide an image forming apparatus which is capable of quickly addressing a response of some kind from a sending destination of a command, when the controller receives the response during the time that the controller is sending the command, and a method for handling the communication data inside the apparatus.

In order to achieve the first object, an image forming apparatus relating to the present invention is provided with a unit and a controller which controls the unit, the apparatus performing data sending and receiving between the unit and the controller, wherein, the controller includes, a receive data amount predicting means which predicts, based on a command sent from the controller to the unit side, a data amount of a response from the unit side for the command having been sent, a receive buffer which temporarily stores data from the unit side, and a buffer management means which stores the data from the unit side sequentially in the receive buffer, and does not store in the receive buffer, a portion of the data from the unit side, the portion exceeding the data amount having been predicted.

As thus described, since a portion of the data from the unit side, which exceeds the predicted data amount, is not stored in the receive buffer, it is possible to avoid hung-up, even when a noise is introduced in the communication data between the controller and the unit and the data amount from the unit side is increased.

A communication handling method in the image forming apparatus relating to the present invention in order to achieve the first object is provided with a unit and a controller which controls the unit, the apparatus performing data sending and receiving between the unit and the controller, wherein, based on a command sent from the controller to the unit side, the controller predicts a data amount of a response from the unit side for the command having been sent, stores the data from the unit side sequentially in the receive buffer, and does not store in the receive buffer, a portion of the data from the unit side, the portion exceeding the predicted data amount.

The image forming apparatus relating to the present invention in order to achieve the second object is provided with a unit and a controller which controls the unit, the apparatus performing data sending and receiving between the unit and the controller, wherein, the controller includes a receive data amount predicting means which predicts, based on a command sent from the controller to the unit side, a data amount of a response from the unit side for the command having been sent, receive data amount measuring means which measures the data amount from the unit side, and a communication error processing means which performs communication error processing when the data amount measured by the receive data amount measuring means does not agree with the data amount predicted by the receive data amount predicting means within a predetermined period of time.

As thus described, since the communication error processing is performed when the predicted data amount is not received within a predetermined period of time, occurrence of hung-up can be avoided, even when a response is not returned in the event of faulty communication between the controller and the unit.

Here, it is preferable that the communication processing means of the image forming apparatus has a retry means which resends the sent command. In this case, it is necessary that the predetermined period of time is to be a period assuring retrying for a predetermined number of counts by the retry means, within a communication available period between the apparatus and a destination of the command having been sent.

It is further preferable that the image forming apparatus is provided with a response time setting means which determines the predetermined period of time according to a description of the command having been sent.

In addition, the image forming apparatus may also be provided with a receive buffer which temporarily stores data from the unit side, and a buffer managing means which stores data from the unit side sequentially in the receive buffer, and does not store a portion of the data which exceeds the predicted data amount. In this case, since the portion of the data from the unit side, which exceeds the predicted data amount, is not stored in the receive buffer, it is possible to avoid a hung-up even when a noise is introduced in the communication data between the controller and the unit and the data amount from the unit side is increased.

The image forming apparatus relating to the present invention in order to achieve the third object is provided with a unit and a controller which controls the unit, and in the image forming apparatus, only after a command is sent from the controller, a proper response is sent from the unit side for the command, wherein the controller is provided with a response detecting means which detects a receipt of a response from the unit side, and a transmission stop means which stops sending the command when the response detecting means detects the receipt of the response.

When a response is received during a command transmission, this response is not a proper response for this command. Therefore, upon receipt of this improper response, the command transmission is stopped. Consequently, handling of this response, that is, to be more precise, communication retry or the like, can be performed quickly.

Here, it is preferable that the controller is provided with a receive buffer which temporarily stores the response sent from the unit side, an interpreting means which interprets the response stored in the receive buffer, and a handling means which performs a processing according to the response which is interpreted by the interpreting means when the command transmission is stopped by the transmission stop means. In this case, it is preferable that this handling means has a communication error processing means which resends the command. In addition, it is further preferable that the response detecting means as thus described starts detecting whether or not a response has been received, from the time when transmission of the command is started.

In addition, the controller may also be provided with a receive buffer management means which clears the receive buffer at the time when transmission of the command is started. With the receive buffer management means thus provided, when a response is received during the command transmission, it can be stored in the receive buffer. Therefore, the response stored in the receive buffer is interpreted, thereby handling this response.

In addition, the controller is provided with a receive data amount predicting means which predicts, based on a command from the controller to the unit side, a data amount of a proper response from the unit side to the command, and a receive data amount measuring means which measures a data amount from the unit side, wherein, the handling means may be provided with a communication error processing means which resends the command when the data amount measured by the receive data amount measuring means does not agree with the data amount predicted by the receive data amount predicting means within a predetermined period of time. As thus described, since the communication error processing is performed when the data amount being predicted is not received within a predetermined period of time, occurrence of hung-up can be avoided, even when a response is not returned in the event of faulty communication between the controller and the unit.

Furthermore, the controller may also be provided with a receive buffer managing means which stores sequentially a response from the unit side in the receive buffer, and does not store in the receive buffer a portion of the data in the response from the unit side, the portion exceeding the data amount predicted by the receive data amount predicting means. In this case, since the portion of the data from the unit side, which exceeds the predicted data amount, is not stored in the receive buffer, it is possible to avoid a hung-up even when a noise is introduced in the communication data between the controller and the unit and the data amount from the unit side is increased.

In addition, in the image forming apparatus provided with the receive buffer and the buffer managing means, a predetermined area within a communication frame constituting a response contains verification data of at least one part of the data within the communication frame, and the apparatus may be provided with an interpreting means which determines whether or not the data stored in said receive buffer is an appropriate response, based on the data stored in a position corresponding to the predetermined area within the communication frame, out of the data stored in the receive buffer. In this case, since it is judged whether or not the data stored in the receive buffer is appropriate based on the data in the area in the receive buffer where the verification data is supposed to be stored, it is possible to determine whether the data is appropriate or not, according to not only the situation where the receive data agrees with the predicted data amount, but also the situation the receive data is less than or more than the predicted data amount. It is to be noted that when the receive data is more than the predicted data amount, only the data corresponding to the predicted data amount is stored.

The image forming apparatus as thus described so far may be provided with a controller side radio communication means which establishes wired connection with the controller and performs wired communication with the controller, wherein the unit has a memory-equipped radio communication device which performs radio communication with the controller side radio communication means, and the memory-equipped radio communication device may also include a radio communication means which performs radio communication with the controller side radio communication means, a memory in which data is stored, and a control means which writes data into the memory or reads data from the memory according to the description of the radio communication by the radio communication means. In this case, if the unit is attachable to/detachable from a casing of the image forming apparatus, it is possible to omit connection process and disconnection process for communication lines in detaching/attaching the unit.

The communication data handling method of the image forming apparatus relating to the present invention in order to achieve the third object is provided with a unit and a controller which controls the unit, and in the image forming apparatus a proper response is sent from the unit side for a command, only after the command is sent from the unit, wherein, the method is provided with a response detecting step which detects a receipt of the response from the unit side, a transmission stop step which stops sending the command when the response detecting step detects the receipt of the response, an interpreting step which interprets the response, and a handling step which performs a process according to the response which has been interpreted in the interpreting step.

BRIEF DESCRIPTION OF THE DRAWINGS

FIG. 7 is an illustration showing an in-memory data structure of a tag for developing unit according to an embodiment.

FIG. 8 is an illustration showing an in-memory data structure of a tag for photoconductor unit according to an embodiment.

FIG. 10 is an illustration showing a communication frame configuration of error response according to an embodiment.

FIG. 15 is a sequence diagram showing a data communication process in the case of normal response according to an embodiment.

FIG. 16 is a sequence diagram showing a data communication process in the case of abnormal response according to an embodiment.

FIG. 17 is a timing diagram showing a status of receiving a response in the course of command transmission according to an embodiment.

PREFERRED EMBODIMENTS OF THE PRESENT INVENTION

Hereinafter, various embodiments relating to the present invention will be explained with reference to the accompanying drawings.

One embodiment of image forming apparatus relating to the present invention will be explained with reference to the drawings.

The image forming apparatus according to the present embodiment is a color laser beam printer.

<Overview of the Printer>

Basic Configuration of the Printer

Figure 2:
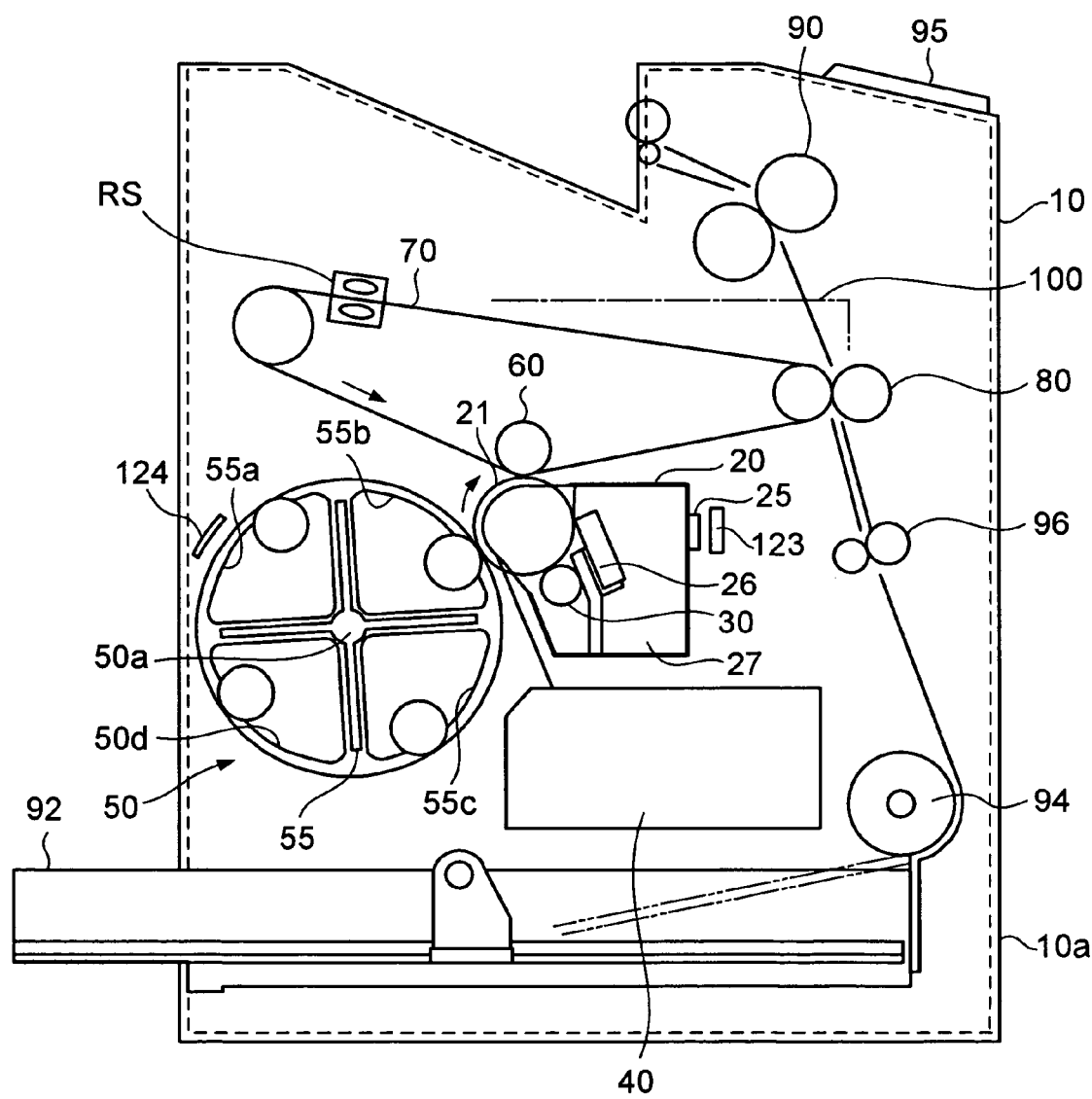
FIG. 2 is an illustration showing an internal configuration of the printer according to an embodiment.

As shown in FIG. 2, the printer 10 according to the present embodiment is provided with a photoconductor unit 20 having a photoconductor 21, a charging unit 30 which charges the photoconductor 21, an exposing unit 40 which irradiates a laser and forms a latent image on the photoconductor 21 being charged, YMCK developing device 50 having multiple developing units 51, 52, 53, and 54, a primary transfer unit 60 having an intermediate transfer body 70 on which a single toner image formed on the photoconductor 21 is transferred, secondary transfer unit 80 which transfers to printing media, a single toner image or a full color toner image having been transferred onto the intermediate transfer body 70, fusing unit 90 which fuses onto the printing media the toner image having been transferred thereon, display unit 95 as a notification means to a user, a control unit 100 which controls those units and the like above, paper feeding tray 92, and printer casing 10a which covers the elements above.

The charging unit 30, exposing unit 40, YMCK developing device 50, primary transfer unit 60, and intermediate transfer body 70 are arranged in this order, around the photoconductor 21 in the rotating direction thereof. It is to be noted, in the present embodiment, the photoconductor 21 rotates clockwise as shown by the arrow in FIG. 2.

In addition to the aforementioned photoconductor 21, the photoconductor unit 20 is provided with a cleaning blade 26 which scraps toner off the photoconductor 21, a waste toner container 27 which accommodates the scraped toner, and a memory-equipped communication tag 25. In addition, the charging unit 30 is mounted on the photoconductor unit 20, in such a manner as opposed to the photoconductor 21. The photoconductor 21 has a cylindrically shaped conductive material, a photosensitive layer formed on the outer peripheral surface thereof, and the photoconductor is rotatable about the central shaft of the cylindrically shaped conductive material. The cleaning blade 26 is made of rubber, abutting against the surface of the photoconductor 21, and after the toner image is transferred onto the intermediate transfer body 70, the cleaning blade scraps the toner remaining on the photoconductor 21 and removes it.

Exposing unit 40 includes a semiconductor laser, a polygon mirror, F-θ lens, and the like, and irradiates the photoconductor 21 being electrically charged with a laser which is modulated based on image signals inputted from a host computer, not illustrated.

The YMCK developing device 50 includes a rotary 55 as a rotator, four developing units 51, 52, 53, and 54 mounted on the rotary 55. In FIG. 2, the rotary 55 is rotatable counter-clockwise, and it includes attach/detach sections 55a, 55b, 55c, and 55d, respectively for attaching/detaching the developing units 51, 52, 53, and 54. Black developing unit 51 which contains black (K) toner is attachable to/detachable from the attach/detach section 55a, magenta developing unit which contains magenta (M) toner is attachable to/detachable from the attach/detach section 55b, cyan developing unit which contains cyan (C) toner is attachable to/detachable from the attach/detach section 55c, and yellow developing unit which contains yellow (Y) toner is attachable to/detachable from the attach/detach section 55d.

By rotating the rotary 55, the developing units 51, 52, 53, and 54 respectively mounted on the attach/detach sections 55a, 55b, 55c, and 55d are integrally rotated. In other words, the rotary 55 rotates the four attached developing units 51, 52, 53, and 54 about a central shaft 50a while maintaining their relative positions. Then, each of the developing units 51, 52, 53, and 54 is selectively brought to be opposed to the latent image formed on the photoconductor 21, and the latent image on the photoconductor 21 is developed with the toner contained in each of the developing units 51, 52, 53, and 54.

As described above, the primary transfer unit 60 has the intermediate transfer body 70 onto which a monochrome toner image formed on the photoconductor 21 is transferred. When the four colors of toner are successively transferred over one another, a full-color toner image is formed on the intermediate transferring body 70.

The intermediate transferring body 70 is an endless belt and is rotatably driven at substantially the same circumferential velocity as the photoconductor 21. A read sensor for synchronization RS is provided in the proximity of the intermediate transferring body 70. The read sensor for synchronization RS is a sensor for detecting the reference position of the intermediate transferring body 70, and obtains a synchronization signal Vsync in the sub-scanning direction, which is perpendicular to the main scanning direction. The read sensor for synchronization RS has a light-emitting section for emitting light and a light-receiving section for receiving light. Light that is emitted from the light-emitting section passes through a hole formed in a predetermined position of the intermediate transferring body 70, and when light is received by the light-receiving section, the read sensor for synchronization RS generates a pulse signal. One pulse signal is generated each time the intermediate transferring body 70 makes one revolution.

Figure 3:
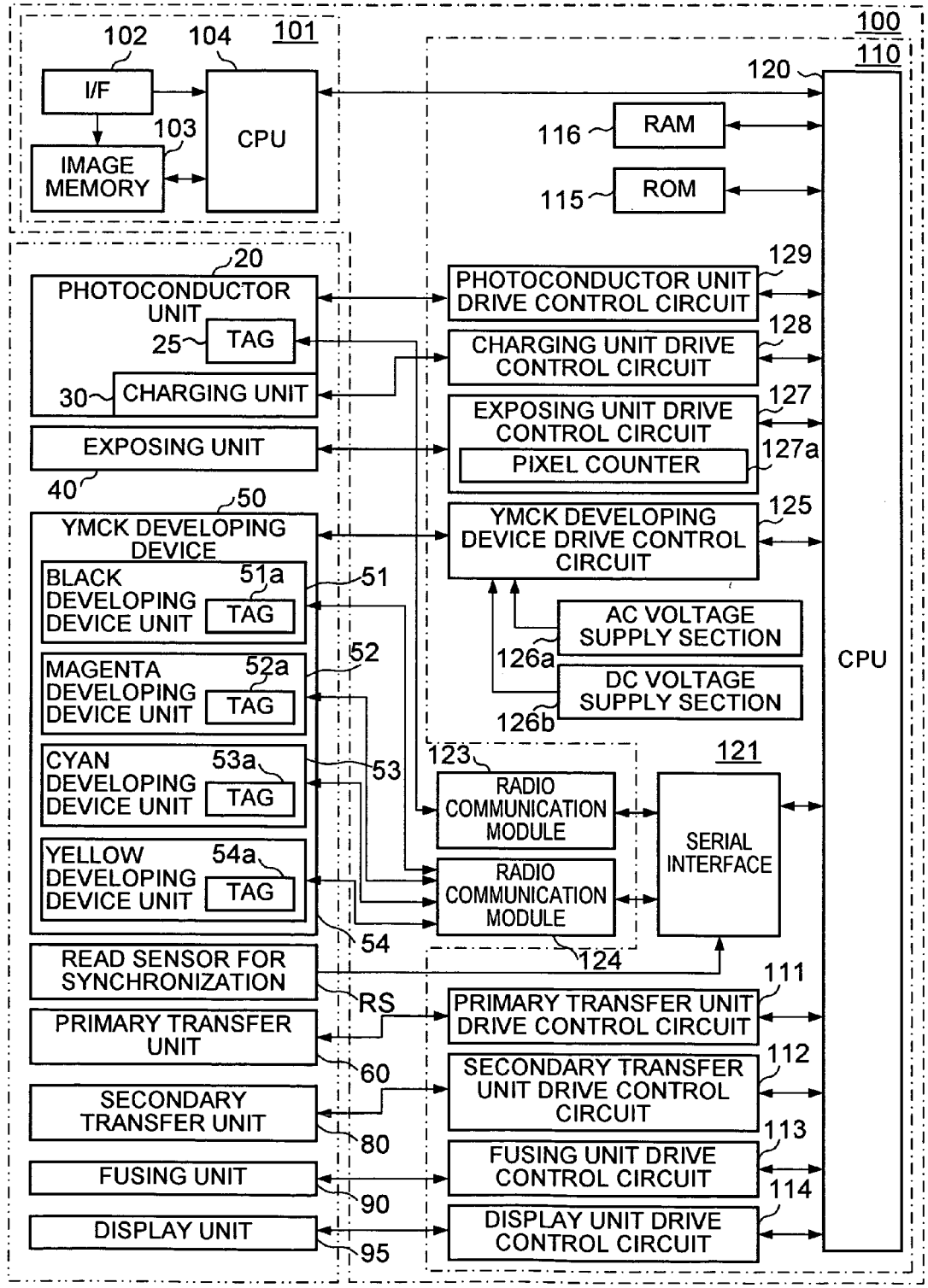
FIG. 3 is a diagram showing a circuit of the printer according to an embodiment.

As shown in FIG. 3, the control unit 100 has a main controller 101 and a unit controller 110, and an image signal is inputted from the host computer or the like. According to a command based on this image signal, the unit controller 110 controls each unit and the like.

Figure 1:
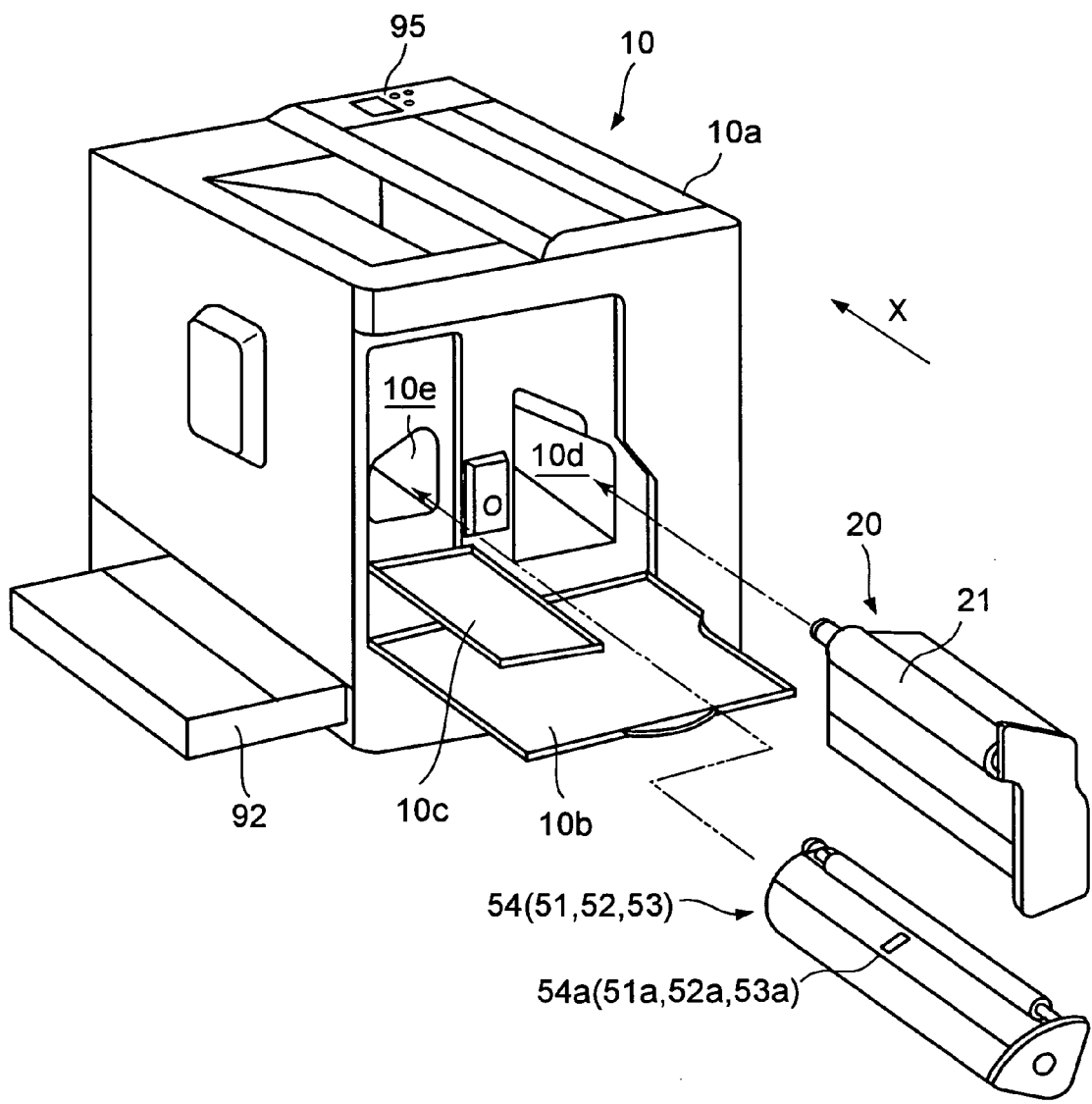
FIG. 1 is an external perspective view of a printer according to an embodiment and each unit is taken apart.

As shown in FIG. 1, the printer casing 10a has a first open/close cover 10b which is openable and closable, a second open/close cover 10c which is also openable and closable, being installed inner side of the first open/close cover 10b, a photoconductor unit attach/detach opening 10d to attach/detach the photoconductor unit 20, and developing unit attach/detach opening 10e to attach/detach the developing units 54 (51, 52, 53). The developing units 54 (51, 52, 53) and the photoconductor unit 20 are attachable to and detachable from the printer casing 10a. Those developing units 54 (51, 52, 53) and the photoconductor unit 20 are mounted on the printer main body 10a, thereby constituting the printer 10.

Therefore, by opening the first open/close cover 10b, a user is allowed to attach/detach the photoconductor unit 20 to/from the printer casing 10a, through the photoconductor unit attach/detach opening 10d. By opening the second open/close cover 10c, the user is allowed to attach/detach the developing units 54 (51, 52, 53) through the developing unit attach/detach opening 10e.

Basic Operation of the Printer

Firstly, when an image signal from the host computer, not illustrated, is inputted into the main controller 101, the unit controller 110 receives a command from the main controller 101, and rotates the photoconductor 21 and the intermediate transfer body 70. Subsequently, the reference position of the intermediate transfer body 70 is detected by the read sensor for synchronization RS and a pulse signal is outputted. This pulse signal is sent to the unit controller 110, and the unit controller 110 controls the following operations using the pulse signal thus received as a reference.

While the photoconductor 21 is rotated, it is charged successively at the charging position by the charging unit 30. The area being charged on the photoconductor 21 is brought to an exposure position along with the rotation of the photoconductor 21, and the exposing unit 40 forms a latent image on this area, according to the image information of the first color, for example, black (K). The latent image formed on the photoconductor 21 is brought to a developing position along with the rotation of the photoconductor 21, and the black developing unit 51 develops the latent image with the black toner. Accordingly, a black toner image is formed on the photoconductor 21. The black toner image formed on the photoconductor 21 is brought to a primary transfer position along with the rotation of the photoconductor 21, and the image is transferred to the intermediate transfer body 70 of the primary transfer unit 60. At this timing, a primary transfer voltage is applied on the primary transfer unit 60, the polarity of the voltage being opposite to that charged on the toner. It is to be noted that throughout the above operation, the second transfer unit 80 is spaced from the intermediate transfer body 70.

The process above is executed repeatedly for the second color, the third color, and the fourth color, whereby toner images of respective colors corresponding to respective image signals are transferred onto the intermediate transfer body 70 in such as manner as superimposing one image on another. Accordingly, a full color toner image is formed on the intermediate transfer body 70.

The full color toner image formed on the intermediate transfer body 70 is brought to the secondary transfer position along with the rotation of the intermediate transfer body 70, and then the secondary transfer unit 80 transfers the image onto the printing media. The printing media is conveyed from the paper feed tray 92, by way of the paper feed roller 94 and resist roller 96, up to the secondary transfer unit 80. While transferring operation is performed, the second transfer unit 80 is pressed against the intermediate transfer body 70 and a secondary transfer voltage is applied on the second transfer unit 80. The fusing unit 90 applies heat and pressure to the full-color toner image that has been transferred to the printing media and the image is fused thereto.

On the other hand, after the photoconductor 21 passes the primary transfer position, the cleaning blade 26 scraps the toner adhered thereon off the surface of the photoconductor, so that the photoconductor is ready to be electrically charged to form the next latent image. The toner having been scraped is collected in the waste toner container 27.

Overview of the Control Unit

As shown in FIG. 3, the main controller 101 of the control unit 100 is provided with interface 102 which is connected to the host computer, image memory 103 which stores image signals inputted from the host computer, and CPU 104 which performs various computing processes.

The unit controller 110 of the control unit 100 is electrically connected with each of the units (charging unit 30, exposing unit 40, primary transfer unit 60, photoconductor unit 20, secondary transfer unit 80, fusing unit 90, and display unit 95), and YMCK developing device 50. The unit controller 110 receives signals from sensors and the like installed on those elements above, thereby detecting the condition of the elements and controlling each unit and the YMCK developing device 50 based on a command inputted from the main controller 101. In order to drive each unit and the YMCK developing device 50, the unit controller 110 is provided with a photoconductor unit drive control circuit 129, charging unit drive control circuit 128, exposing unit drive control circuit 127, YMCK developing device drive control circuit 125, primary transfer unit drive control circuit 111, secondary transfer unit drive control circuit 112, fusing unit drive control circuit 113, and display unit drive control circuit 114. This unit controller 110 is further provided with CPU 120 which controls the above drive control circuits and the like, ROM 115 which stores programs, data, and the like to allow the CPU 120 to operate, and RAM 116 which stores various programs and various data items.

The exposing unit drive control 127 which is connected to the exposing unit 40 has a pixel counter 127a serving as a consumption amount detecting means to detect the consumption amount of toner as a developer. This pixel counter 127a counts the number of the pixels which are inputted into the exposing unit 40. It is also possible to provide the pixel counter 127a in the main controller 101. The aforementioned number of pixels represents the number or pixels in units of basic resolution of the printer 10, in other words, the number of pixels of an image actually printed. Since the consumption (usage) amount of toner T is proportional to the number of pixels, it is possible to detect the consumption amount of toner T by counting the number of pixels.

The YMCK developing device drive control circuit 125 is supplied with AC voltage from AC supplying section 126a, and DC voltage from DC voltage supplying section 126b. The YMCK developing device drive control circuit 125 applies a voltage obtained by superimposing the AC voltage and the DC voltage one on another, to the developing roller provided in each of the developing units, at an appropriate timing, thereby forming an alternate electrical field between the developer roller and the photoconductor 21.

The CPU 120 of the unit controller 110 is capable of performing radio communication, via the serial interface (I/F) 121 and radio communication module 124, with the memory-equipped radio communication tags 51a, 52a, 53a, and 54a which are respectively installed on the developing units 51, 52, 53, and 54. Furthermore, the CPU 120 is also capable of performing radio communication, via the serial interface 121 and radio communication module 123, with the memory-equipped radio communication tag 25 being installed on the photoconductor unit 20. With the configuration as described above, the CPU is capable of writing information into or reading information from each memory of the memory-equipped radio communication tags 51a, 52a, 53a, and 54a respectively provided on the developing units 51, 52, 53, and 54, or the memory of the memory-equipped radio communication tag 25 provided on the photoconductor unit 20.

<Details of Communication between Unit Controller and Developing Unit>

Configuration of the Memory-Equipped Radio Communication Tag

In the present embodiment, the memory-equipped radio communication tag 25 provided on the photoconductor unit 20 and the memory-equipped radio communication tags 51a, 52a, 53a, and 54a respectively provided on the developing units 51, 52, 53, and 54 are the same in configuration. Therefore, as a representative example, the memory-equipped radio communication tag 54a on the yellow developing unit 54 will be explained here, out of those memory-equipped radio communication tags.

Figure 6:
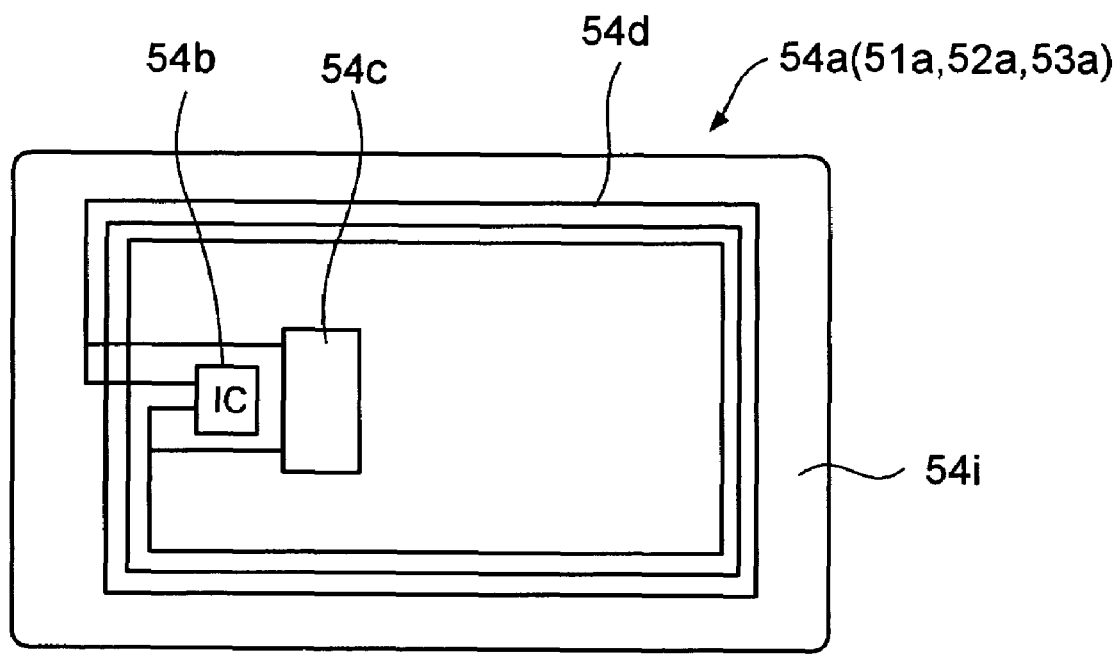
FIG. 6 is a plan view of the memory-equipped radio communication tag according to an embodiment.

As shown in FIG. 6, the memory-equipped radio communication tag 54a includes a thin plastic film 54i, IC chip 54b, resonant condenser 54c, and a flat-coil shaped wireless antenna 54d. The plastic film 54i is provided with adhesiveness on one surface. The other surface is equipped with the IC chip 54b, the resonant condenser 54c, and the flat-coil shaped wireless antenna 54d, and those elements are covered with a transparent cover sheet.

Figure 4:
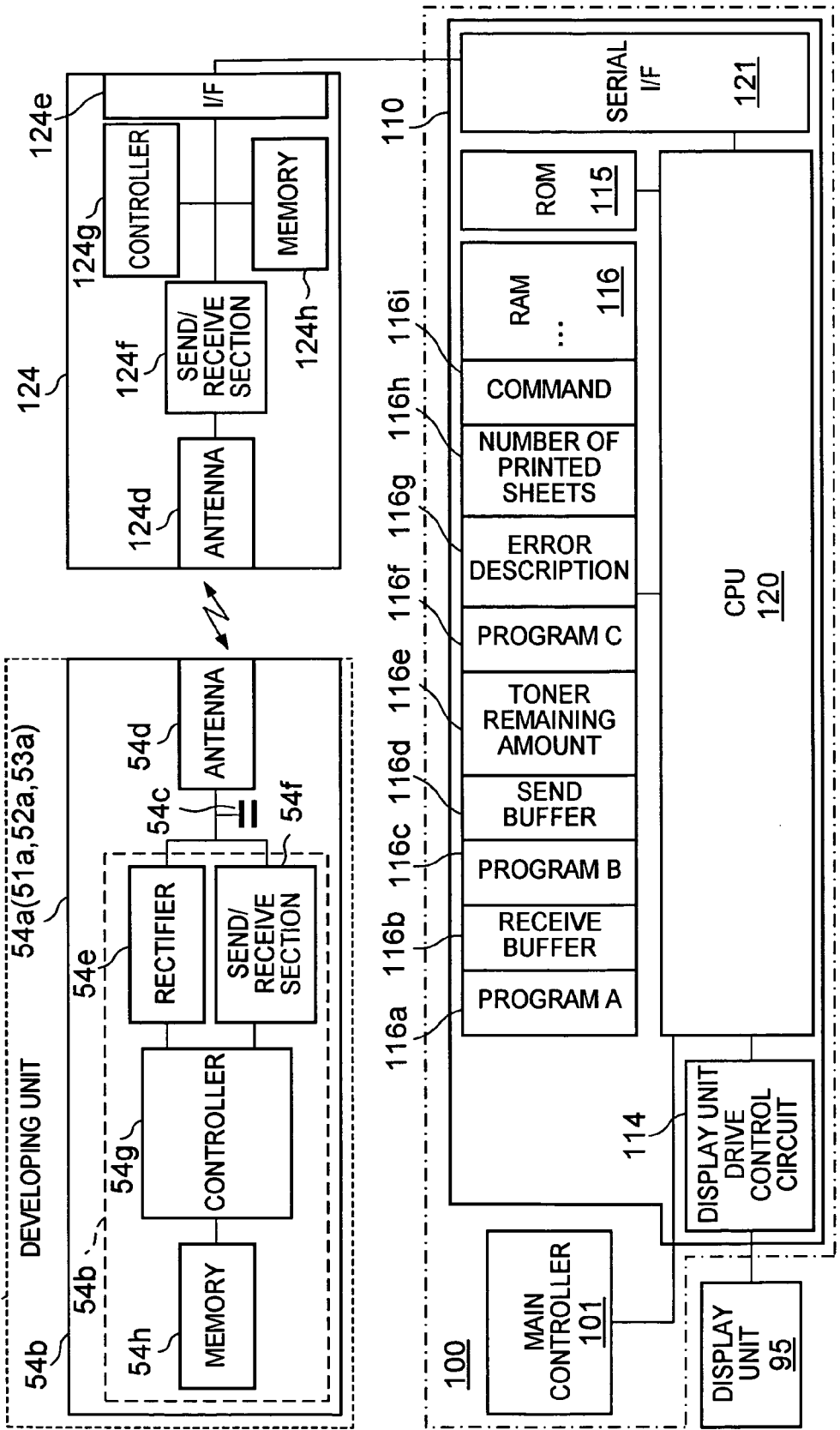
FIG. 4 is a circuit block diagram showing a memory-equipped radio communication tag and radio communication module according to an embodiment.

As shown in FIG. 4, the IC chip 54b of the memory-equipped radio communication tag 54a has a rectifier 54e, send/receive section 54f which performs modulation process, demodulation process, and the like, controller 54g, and memory 54h. The radio communication module 124 which performs radio communication with this tag 54a generates a high frequency magnetic field from the antenna 124d of the module. This high frequency magnetic field is absorbed via the antenna 54d of the memory-equipped radio communication tag 54a. This magnetic field thus absorbed is rectified by the rectifier 54e and it serves as AC power source which drives each circuit within the IC chip 54b. The memory 54h is a nonvolatile memory which is electrically readable and writable, such as NAND-type flash ROM. The controller 54g performs reading data from and writing data to the memory 54h, according to the description of the radio communication from the outside.

As shown in FIG. 7, the memory 54h of the memory-equipped radio communication tag 54a stores various information items. Address 00H stores unique ID information such as serial number of the tag or the developing unit, address 01H stores manufacturing date of the developing unit, address 02H stores information for specifying a destination of the developing unit, address 03H stores information for specifying a manufacturing line on which the developing unit was manufactured, address 04H stores information for specifying a model with which the developing unit is compatible, and address 05H stores toner remaining amount information as information indicating the amount of toner contained in the developing unit. The address 06H and subsequent areas store appropriate information.

As shown in FIG. 8, the memory in the memory-equipped radio communication tag 25 which is mounted on the photoconductor unit 20 also stores various information items. Address 00H stores unique ID information such as serial number of the tag or the photoconductor unit, address 01H stores manufacturing date of the developing unit, address 02H stores information for specifying a destination of the developing unit, address 03H stores information for specifying a manufacturing line on which the developing unit was manufactured, address 04H stores information for specifying a model with which the developing unit is compatible, address 05H stores information indicating cumulative number of printed sheets when the photoconductor unit is mounted on the printer casing 10a, address 06H stores information indicating cumulative number of printed sheets when the photoconductor is detached from the printer casing 10a upon reaching the end of its service life, address 07H stores the number of sheets printed in color using the photoconductor unit, and address 08H stores the number of sheets printed in monochrome using the photoconductor unit. Further, the address 09H and subsequent areas store appropriate information.

Any of the information item stored in the memory 54h is eight-bit data, that is, one-byte data. Initial values for each information item are stored in the memory 54h in the factory, at least at the time of factory shipment. It is to be noted that in the information items as described above, basically any of the ID information, destination information, manufacturing line information, compatible model information will not be rewritten after the factory shipment.

Configuration of the Radio Communication Module

In the present embodiment, the radio communication module 123 which performs radio communication with the memory-equipped radio communication tag 25 on the photoconductor unit 20, and the radio communication module 124 which performs radio communication with the memory-equipped radio communication tags 51a, 52a, 53a, and 54a respectively on the developing units 51, 52, 53, and 54 are the same in configuration. Therefore, as a representative example here, the radio communication module 124 of the developing units will be explained, out of the radio communication modules 123 and 124.

As shown in FIG. 4, the radio communication module 124 has a wireless antenna 124d which performs radio communication with the memory-equipped radio communication tags 51a, 52a, 53a, and 54a respectively on the developing units 51, 52, 53, and 54, send/receive section 124f which performs modulation process, demodulation process, and the like, controller 124g, readable/writable memory 124h, and serial interface 124e. Wired connection is established between this serial interface 124e and the serial interface 121 of the unit controller 110.

In practice, a memory and a CPU which executes programs stored in this memory constitute any of the controller 124g and the send/receive section 124f in each of the radio communication modules 123 and 124, and the controller 54g and the send/receive section 54f in each of the memory-equipped radio communication tags 25, 51a, 52a, 53a, and 54a as described above.

In the present embodiment, the wireless antenna 54d in each of the memory-equipped radio communication tags 51a, 52a, 53a, and 54a is capable of communicating with the wireless antenna 124d in the radio communication module 124, if mutual distance therebetween is within 10 mm.

Function of CPU and Configuration of Ram in the Unit Controller

As shown FIG. 4, RAM 116 in the unit controller 110 includes program storages 116a, 116c, and 116f which respectively stores programs A, B, and C provided for establishing communications between the unit controller 110 and each of the developing units 51, 52, 53, and 54, and for processing the data obtained in the communication above, receive buffer 116b, send buffer 116d, toner remaining amount storage area 116e which stores the toner remaining amount of each of the developing unit 51, 52, 53, and 54, error description storage area 116g which stores a description of the communication error, number of printed sheets storage area 116h which stores the number of printed sheets, and the command storage area 116i which temporarily stores the command to be sent to the memory-equipped radio communication tags 51a, 52a, 53a, and 54a.

Figure 5:
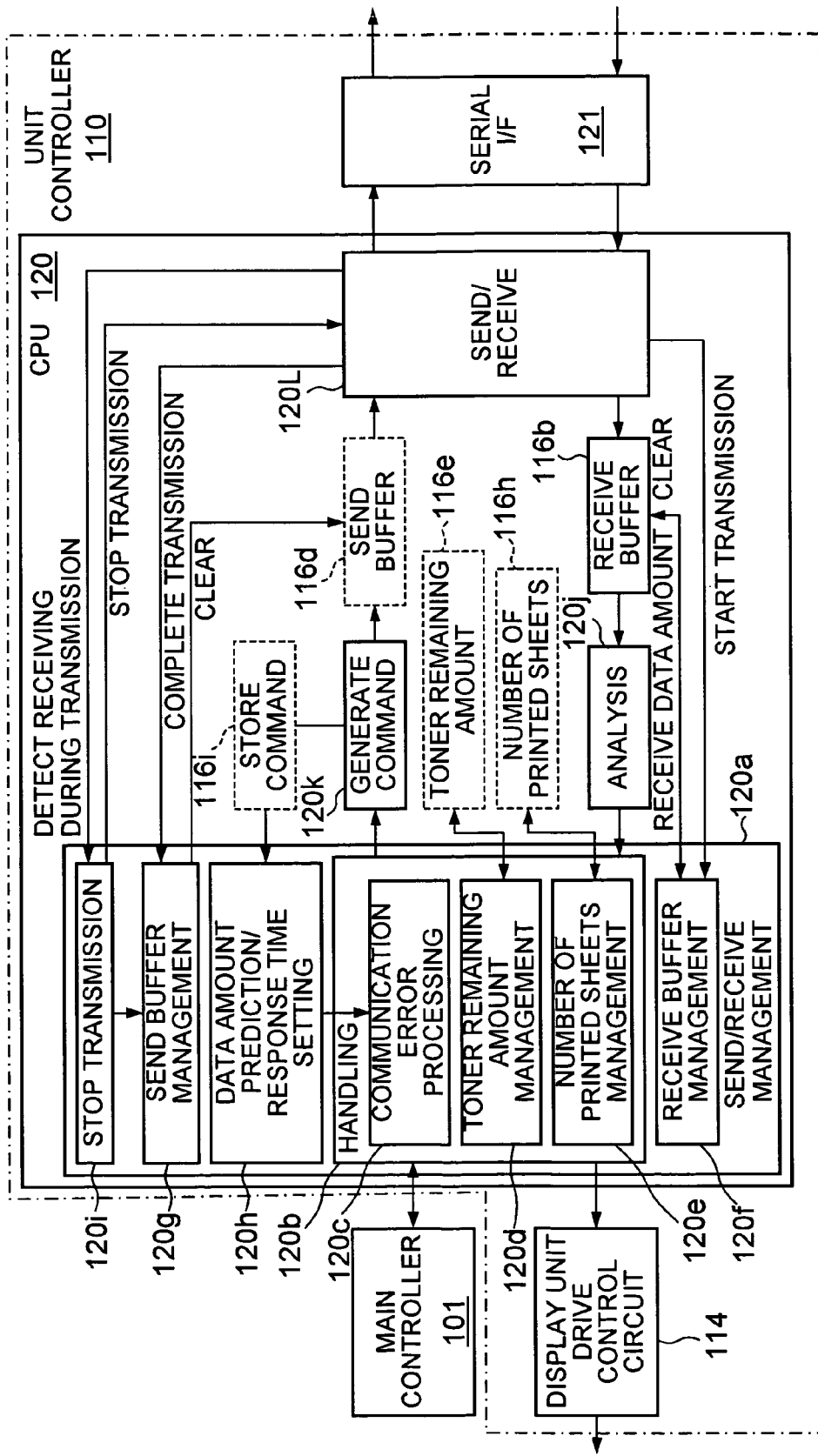
FIG. 5 is a functional block diagram of the CPU within a unit controller according to an embodiment.

The CPU 120 executes the programs A, B, and C stored in the RAM 116, thereby performing various functions. In other words, as shown in FIG. 5, the CPU 120 includes send/receive function 120L which performs sending and receiving to/from each developing units 51, 52, 53, and 54 and the photoconductor unit 20 side, send/receive management function 120a which manages operations and the like of the send/receive function 120L, analyzing function 120j which analyzes data stored in the receive buffer 116b, and command generating function 120k which generates a command according to an instruction from the send/receive management function 120a. The send/receive management function 120a includes a handling function 120b which handles a data analysis result from the analyzing function 120i and a command and the like from the main controller 101, receive buffer management function 120f which manages clearing and the like of the receive buffer 116b, send buffer management function 120g which manages clearing and the like of the send buffer 116d, receive data amount predict/response time setting function 120h which predicts data amount of proper response sent from each of the developing units 51, 52, 53, and 54 via the radio communication module 124, and determines a threshold value of response time that is a time period from when a command is sent, until when a proper response arrives from each of the developing units 51, 52, 53, and 54. The handling function 120b includes a communication error processing function 120c which handles a communication error according to the data analysis result from the analyzing function 120j, toner remaining amount management function 120d which manages read from and write to the toner remaining storage area 116e or the like, and number of printed sheets management function 120e which manages write to and read from the number of printed sheets storage area 116h or the like.

In FIG. 5, the receive buffer 116b, send buffer 116d, toner remaining amount storage area 116e, and command storage area 116i are depicted within the frame of the CPU 120. This aims at clarifying the relationship between those elements and each of the functions 120a, 120b, etc., as described above in the CPU 120. For ease of explanation, those elements 116b, 116d, 116e, and 116i are depicted within the frame of the CPU 120, but in practice, as already explained, they exist in RAM 116 of the unit controller 110 (see FIG. 4). In FIG. 5, for ease of understanding the communication functions, only the functional elements relating to the present invention, such as functions required for communicating with each unit, are depicted out of the multiple functions of the CPU 120.

Here, main operations regarding the communication process by the CPU 120 will be explained briefly. Details will be described later.

Here, it is assumed a case that the unit controller 110 tries to write remaining amount of black toner into the memory of memory-equipped radio communication tag 51a on the black developing unit 51.

In this situation, the toner remaining amount management function 120d reads out black toner remaining amount stored in the toner remaining amount storage area 116e in the RAM 116, then allows the command generation function 120k to generate a write command as to this black toner remaining amount. The write command generated by this command generation function 120k is once stored in the send buffer 116d, and then, the send/receive function 120L sends the command to the memory-equipped radio communication tag 51a on the black developing unit 51 via the radio communication module 124. Starting of this command transmission is notified to the receive buffer management function 120f from the send/receive function 120L, and the receive buffer management function 120f clears the receive buffer 116d. Completion of this command transmission is notified to the send buffer management function 120g from the send/receive function 120L, and the send buffer management function 120g clears the send buffer 116d.

When the black toner remaining amount is written in the memory of the memory-equipped radio communication tag 51a, a write response is sent from the memory-equipped radio communication tag 51a to the unit controller 110. This write response is firstly received by the send/receive function 120L of the CPU 120, and then stored in the receive buffer 116b. The write response stored in the receive buffer 116b is analyzed by the analyzing function 120j, and it is determined whether or not the write response is properly associated with the write command previously sent. If it is the proper write response, the unit controller 110 performs the next scheduled processing. On the other hand, if the write response is improper, it is notified to the communication error processing function 120c. The communication error processing function 120c instructs the command generation function 120i to output the previous write command, so that the previous write command is sent once again, that is, communication retry is performed. The command generation function 120i, which has received this instruction, reads out a write command which was stored in the command storage area 116i when the command was generated previously, and stores this command in the send buffer 116d. The send/receive function 120L sends once again the write command stored in the send buffer 116d to the memory-equipped radio communication tag 51a on the black developing unit 51 via the radio communication module 124.

Configuration of Send/Receive Frame in the Unit Controller

Data sent from the unit controller 110 to each of the developing units 51, 52, 53, and 54 via the radio communication module 124, includes a read command and a write command.

Figure 9A:
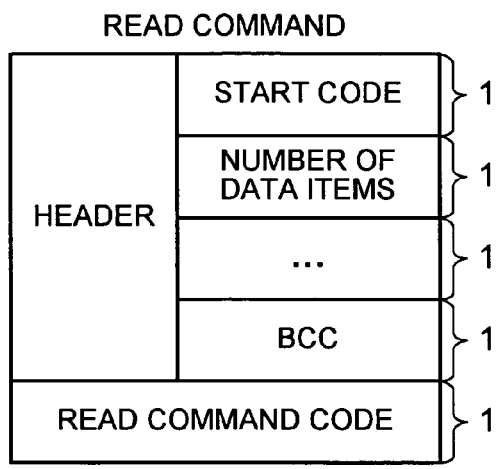
FIG. 9A is an illustration showing a communication frame configuration of read command.

As shown in FIG. 9A, the communication frame of the read command includes a header and a payload. The header contains a start code indicating a start of data, number of data items in this communication frame, other specifications of this communication frame, and BBC (Block Check Character) for data verification. The payload contains a readout command code indicating that it is a readout command. In addition to the information that the command is for reading data, this readout command code includes readout area information indicating an area in the memory of the memory-equipped radio communication tag, from which the data is to be read out. Any of these information items in the communication frame has one-byte length each. Therefore, the total number of bytes of the read command communication frame is five.

BCC is placed into the last part of the data area in the header, and it is used for determining whether or not the data contained in the payload portion is appropriate. There are many kinds of BCC, but in the example here, a value of exclusive OR of the data contained in the payload portion, in units of byte, is assumed as BCC. For example, BCC of 01h, 02h, and 04h is represented by the value of exclusive OR thereof, that is, 01h ExOr 02h ExOR 04h=07h.

For example, data in the data area in the last part of the header in a certain communication frame is extracted, and simultaneously data in the payload portion is extracted. If the exclusive OR of the data in the payload part is not equal to the value indicated by the data in the last data area of the header, the data in the communication frame is determined as inappropriate data. In addition, in the example here, BCC is contained in the last data area of the header, but it is also possible to contain BCC in the last data area of the whole communication frame. In other words, it is sufficient that BCC is contained in a predetermined area within the communication frame. In this example, only the data in the payload portion is a target for verification. However, a part of the header, for instance, data in the area where the number of data is stored may also be a target for this verification as well. Here, BCC is used as data for verification, but CRC (Cyclic Redundancy Check) may be used as an alternative.

Figure 9B:
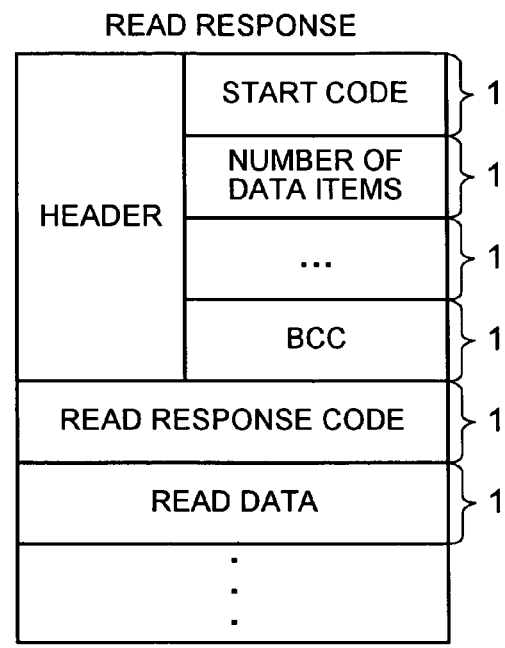
FIG. 9B is an illustration showing a communication frame configuration of read response.
Figure 9C:
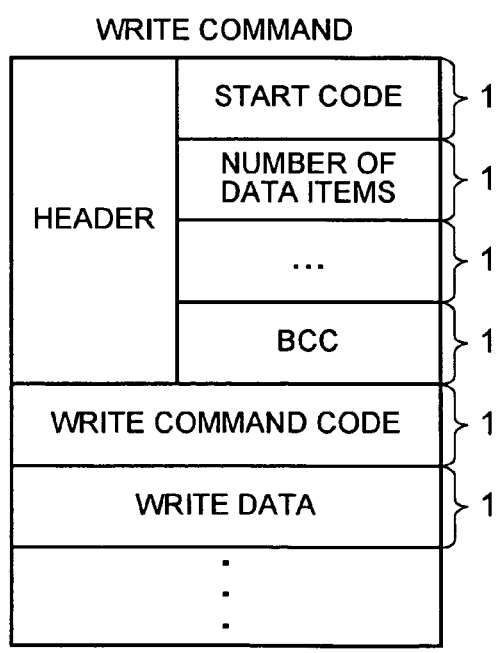
FIG. 9C is an illustration showing a communication frame configuration of write command.

As shown in FIG. 9C, a communication frame of the write command also includes a header and a payload. Similar to the header in the communication frame of the read command, the header of the write command also contains a start code, number of data items, other specifications, and BCC. Furthermore, the payload contains a write command code indicating that it is a write command, and data which is actually to be written. In addition to the information that the command is for writing data, this write command code includes write area information indicating an area in the memory of the memory-equipped radio communication tag, into which the data is to be written. Any of these information items in the communication frame has one-byte length each. Therefore, the total number of bytes of the write command communication frame is five, which is the same as the read command, if the write data is excluded.

Data sent from each of the developing units 51, 52, 53, and 54 to the unit controller 110 via the radio communication module 124, includes a read response for the aforementioned read command, and a write response for the aforementioned write command.

As shown in FIG. 9B, a communication frame of the read response for the read command also includes a header and a payload. The header also contains, similar to the header of the communication frame of the read command, a start code, number of data items, other specifications, and BCC. In addition, the payload contains a read response code indicating that it is a read response, and data actually read out. Any of these information items in the communication frame has one-byte length each. Therefore, the total number of bytes of the read response communication frame is five, which is the same as the read command, if the readout data is excluded.

Figure 9D:
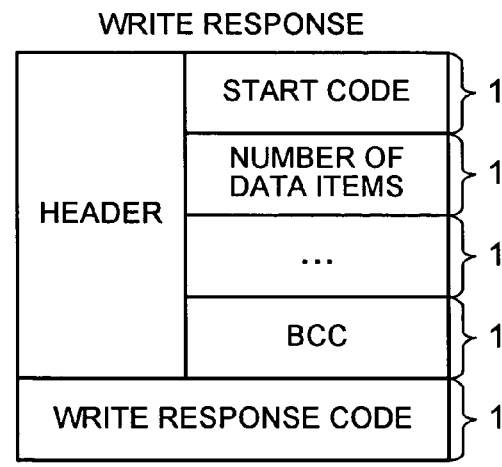
FIG. 9D is an illustration showing a communication frame configuration of write response.

As shown in FIG. 9D, a communication frame of the write response for the write command also includes a header and a payload. The header also contains, similar to the header of the read command communication frame, a start code, number of data items, other specifications, and BCC. In addition, the payload contains a write response code indicating it is a write response. Any of these information items in the communication frame has one-byte length each, and thus the total number of bytes of the write response communication frame is five, which is the same as the read command.

In addition to the read response and write response as described above, data sent to the unit controller 110 includes an error response. The error response may be sent from each of the developing units 51, 52, 53, and 54, via the radio communication module 124. However, in some cases, the radio communication module 124 transmits the error response to the unit controller 110, due to a fault of radio communication between each of the developing units 51, 52, 53, 54, and the radio communication module 124, or breakdown of some kind and the like in the radio communication module 124.

As shown in FIG. 10, a communication frame of this error response also includes a header and a payload. Similar to the header in the communication frame of the read command, the header of the error response also contains a start code, number of data items, other specifications, and BCC. Furthermore, the payload contains an error response code indicating that it is an error response. Any of these information items in the communication frame has one-byte length each. Therefore, the total number of bytes of the error response communication frame is five, which is the same as the read command.

Communication Timing between the Unit Controller and the Developing Unit

Communication for reading data from the memory-equipped radio communication tag 25 on the photoconductor unit 20 and the memory-equipped radio communication tags 51*a*, 52*a*, 53*a*, and 54*a* respectively on the developing units 51, 52, 53, and 54 is basically carried out at the timing of starting up the printer and unit replacement. On the other hand, communication for writing data into each of the memory-equipped radio communication tags 25, 51*a*, 52*a*, 53*a*, and 54*a*, is carried out during a stage of printing process.

Figure 12:
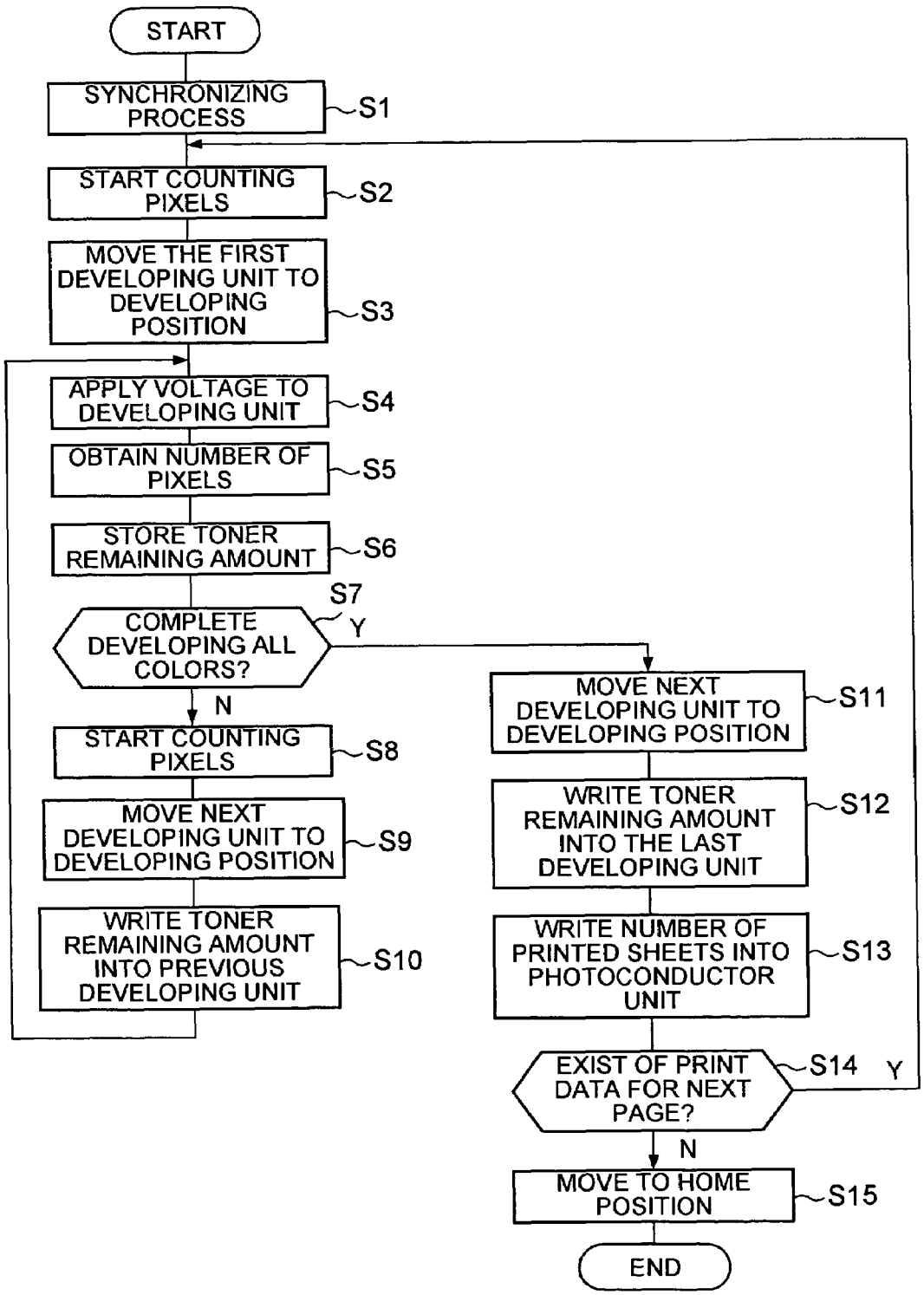
FIG. 12 is a flowchart showing an operation upon printing in the unit controller according to an embodiment.

According to the flowchart as shown in FIG. 12, timing for writing data into each of the tags 25, 51*a*, 52*a*, 53*a*, and 54*a* during the printing process will be explained.

When an image signal as an image forming process command from the host computer is inputted into the main controller 101 of the printer via the interface (I/F) 102, the unit controller 110 rotates the photoconductor 21 and the intermediate transfer body 70 as synchronizing process, receives from the read sensor for synchronization RS, a pulse signal as a reference position of the intermediate transfer body 70, and executes the following control using the pulse signal as a reference (S1).

When black image information is inputted from the main controller 101 into the exposing unit 40, and when this exposing unit forms a latent image according to the black image information on an already-charged photoconductor 21, the CPU 120 of the unit controller 110 allows the pixel counter 127*a* to start counting the number of pixels inputted into the exposing unit 40 (S2).

The CPU 120 rotates the rotary 55 to move the black developing unit 51 to the developing position, that is, a position being opposed to the photoconductor 21 (S3), and developing bias is applied to the developing roller of the black developing unit 51 (S4). This developing bias is a voltage which is obtained by superimposing AC voltage and DC voltage one on another as mentioned above. It is also possible that the developing bias is applied to the developing roller before the black developing unit 51 reaches the developing position. Alternatively, the developing bias may be applied to the developing roller after the black developing unit 51 reaches the developing position. When applying the developing bias to the developing roller of the developing unit 51 is completed, thereby ending the developing operation by the black developing unit 51, the CPU 120 obtains the counted number of pixels from the pixel counter 127*a* (S5). Since the number of pixels having been counted is proportional to the consumption amount of black toner, it is possible to obtain the consumption amount of the black toner.

Next, the toner remaining amount management function 120*d* of the CPU 120 reads out the black toner remaining amount which is stored in the toner remaining amount storage area 116*e* in the RAM 116. Then, the toner consumption amount is subtracted from the toner remaining amount, and a new remaining amount is obtained, and this new data is stored in the toner remaining amount storage area 116*e* in the RAM 116 (S6).

Subsequently, the CPU 120 determines whether or not the developing process for all of the colors have been completed (S7), and if it is not completed yet, the CPU 120 further allows the pixel counter 127*a* to start counting the number of pixels inputted into the exposing unit 40 (S8). At this timing, image information of magenta has already been inputted into the exposing unit 40 from the main controller 101, and this exposing unit 40 has started forming a latent image according to the magenta image information on the photoconductor 21 having been electrically charged.

Figure 11A:
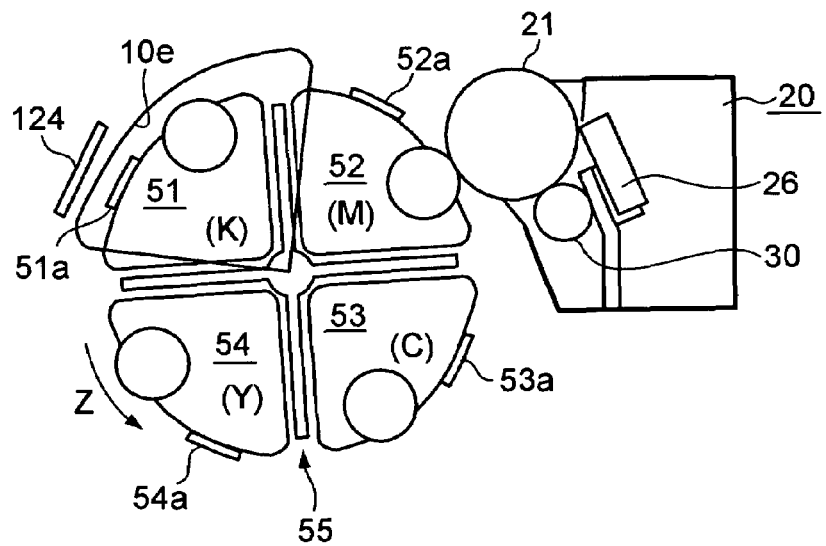
FIG. 11A is an illustration showing a positional relationship between the photoconductor unit and the developing device at developing position.

When the pixel counting is started (S8), the CPU 120 locates the developing unit 52 of magenta to be developed subsequent to black, onto the developing position (S9). As shown in FIG. 11A, when this magenta developing unit 52 is located at the developing position, the memory-equipped radio communication tag 51*a* on the black developing unit 51 is opposed to the radio communication module 124, and communication is available therebetween. Then, the toner remaining amount managing function 120*d* of the CPU 120 reads out the black toner remaining amount stored in the toner remaining amount storage area 116*e* in the RAM 116, and allows the command generation function 120*k* to generate a write command regarding the black toner remaining amount. The write command generated by the command generation function 120*k* is sent from the send/receive function 120L to the memory-equipped radio communication tag 51*a* on the black developing unit 51, via the radio communication module 124. Consequently, the latest data as to the black toner remaining amount is written into the memory of the tag 51*a* (S10).

After writing the information as to the toner remaining amount into the memory-equipped radio communication tag 51*a* is completed (S10), the process returns to step 4 again, and a developing bias is applied to the developing roller of the magenta developing unit 52 located at the developing position. Subsequently, the steps 4 to 10 are repeated to complete developing of magenta, developing of cyan, and developing of yellow. When it is determined that developing of all the colors is completed, the black developing unit 51 next to the yellow developing unit 54 is located at the developing position, and the memory-equipped radio communication tag 54*a* on the yellow developing unit 54 is opposed to the radio communication module 124 (S11). Then, the CPU 120 reads out the yellow toner remaining amount stored in the toner remaining amount storage area 116*e* in the RAM 116, and writes the yellow toner remaining amount into the memory of the memory-equipped radio communication tag 54*a* on the yellow developing unit 54, which is a unit targeted for developing finally (S12). If only black is developed, at the stage of developing black firstly, it is determined that developing of all the colors has been completed in the processing of step 7, and in the process of steps S11 and S12, information as to the black toner remaining amount is written in the memory in the memory-equipped radio communication tag 51*a* on the black developing unit 51.

When writing of toner remaining amount to the developing unit is completed, which has been developed finally (S12), the number of printed sheets management function 120*e* of the CPU 120 adds the number of newly printed sheets to the number of sheets stored in the number of printed sheets storage area 116*h* in the RAM 116, and writes the result into the number of printed sheets storage area 116*h*. Simultaneously, the command generation function 120*k* is made to generate a write command as to this obtained number of printed sheets. The write command generated by the command generation function 120*k* is sent from the send/receive function 120L to the memory-equipped radio communication tag 25 on the photoconductor unit 20 via the radio communication module 123. Consequently, the latest data regarding the number of printed sheets is written into the memory of the tag 25 (S13).

Then, the CPU 120 determines whether or not there exists print data for the next page (S14), and if there is print data for the next page, the process returns to step 2. On the other hand, if there is not print data for the next page, the developing device 50 is made to be located on the home position as shown in FIG. 1C, and printing process is completed.

Figure 11B:
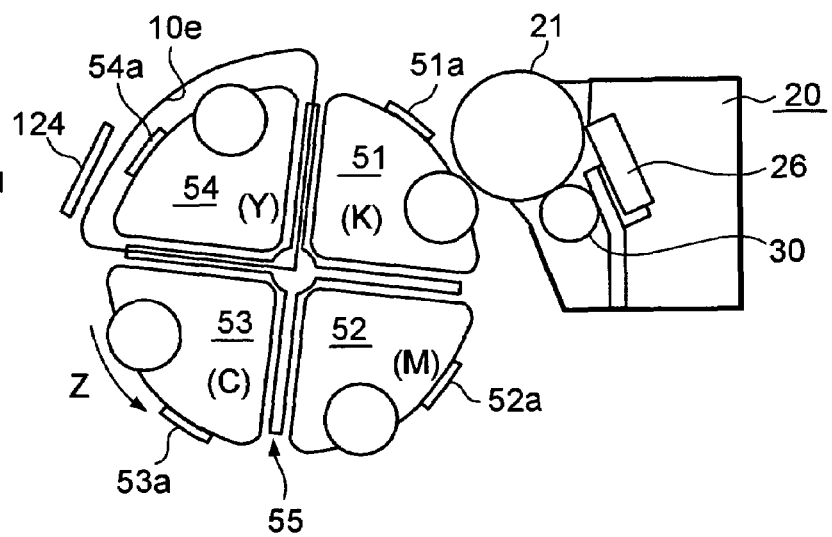
FIG. 11B is an illustration showing a positional relationship between the photoconductor unit and the developing device at attach/detach position.
Figure 11C:
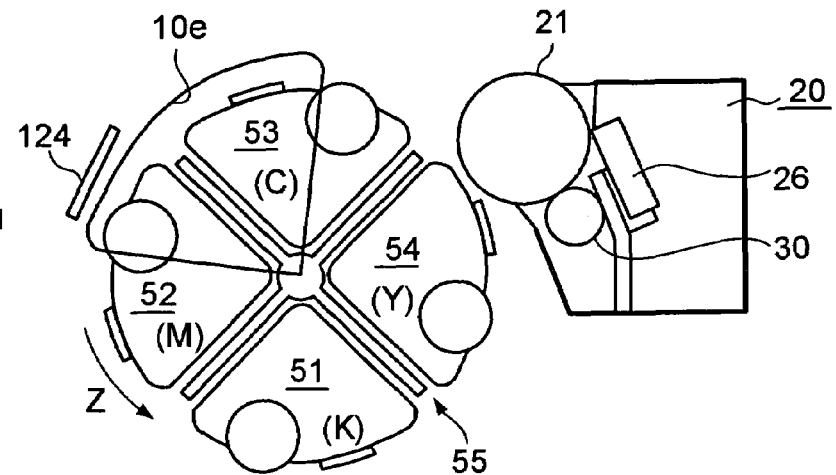
FIG. 11C is an illustration showing a positional relationship between the photoconductor unit and the developing device at home position.

As shown in FIG. 11B, when it is intended to detach the yellow developing unit 54, this yellow developing unit 54 is located at a position corresponding to the developing unit attach/detach opening 10e of the printer casing 10a, thereby allowing the yellow developing unit 54 to be detached from the printer casing 10a.

In the descriptions above, during the printing process, only the communication for writing data into the tag of each developing unit is executed. However, it is also possible to establish communication for reading data, just before establishing the communication for writing the data, in order to check the data stored in the tag right before the data writing.

Operation Details of Communication between Unit Controller and Developing Unit

Figure 13:
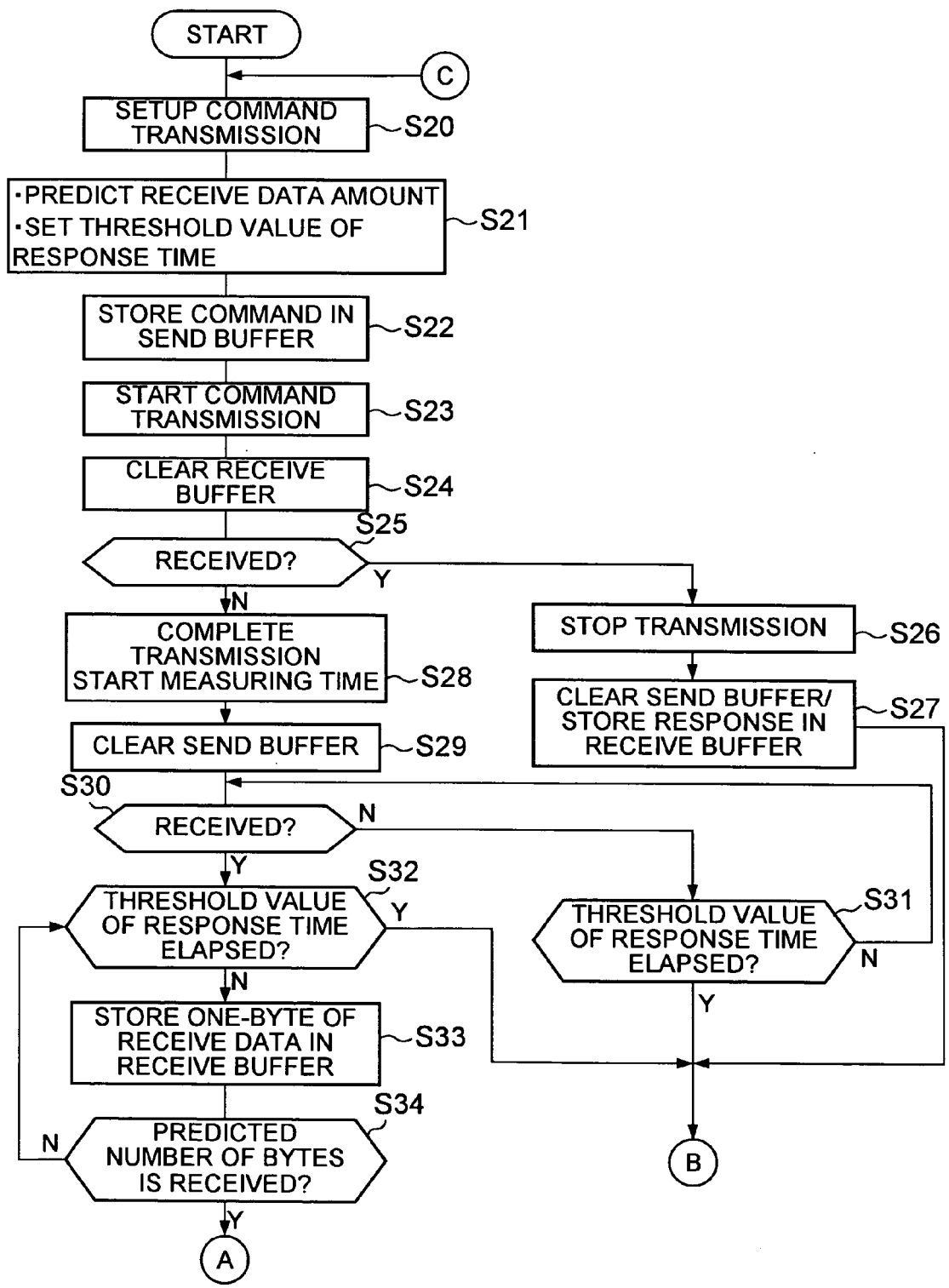
FIG. 13 is a flowchart (1) showing an operation of communication process in the unit controller according to an embodiment.
Figure 14:
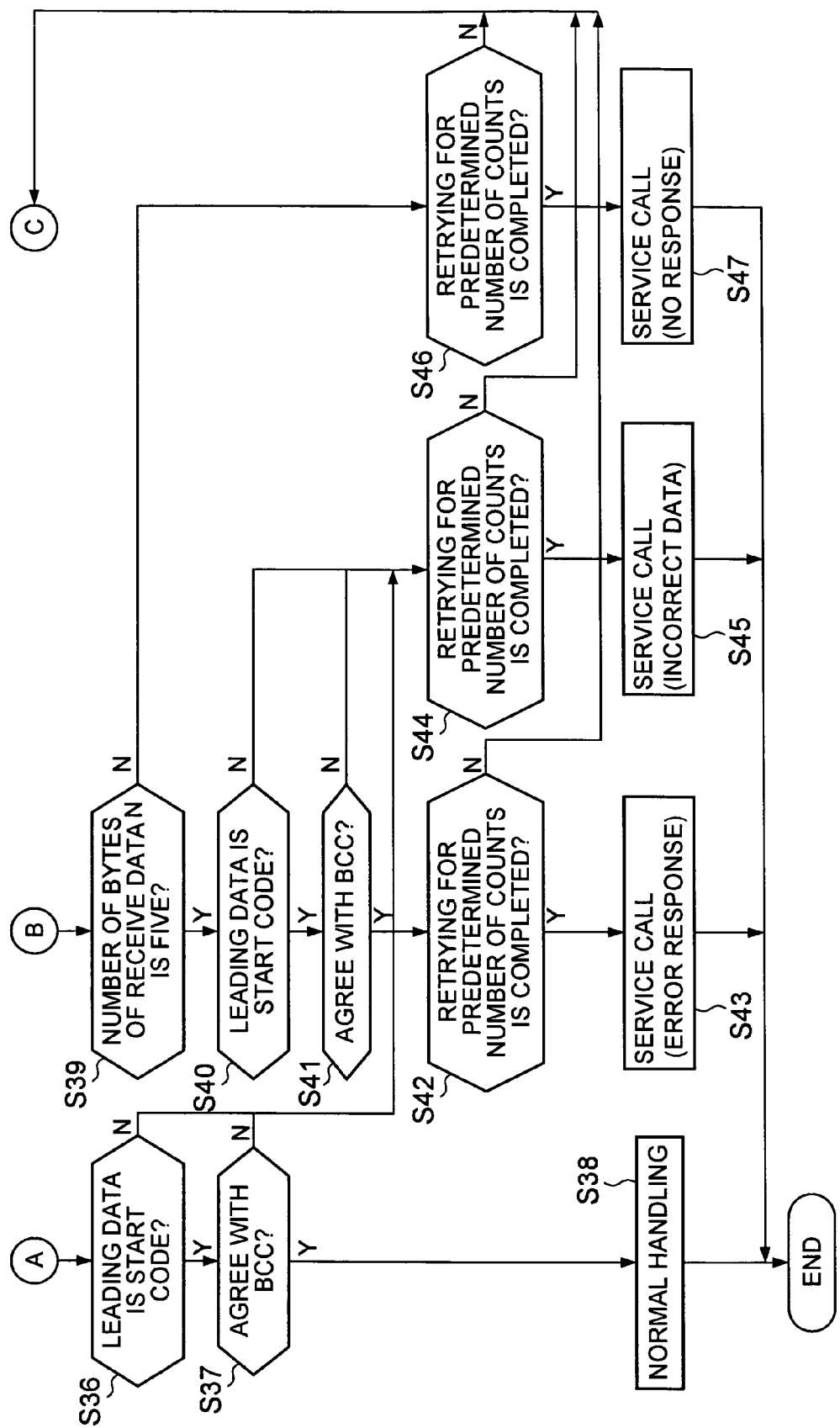
FIG. 14 is a flowchart (2) showing an operation of communication process in the unit controller according to an embodiment.

According to the flowcharts in FIG. 13 and FIG. 14, and the sequence diagrams in FIG. 15 and FIG. 16, operations of communication between the unit controller and the developing unit will be explained. The sequence diagram in FIG. 15 shows only a sequence in the case where the unit controller 110 sent a command and an appropriate response to this command was returned from the developing unit side. The sequence diagram in FIG. 16 shows only a sequence in the case where an error response is returned from the radio communication module 124 in the course of command transmission from the unit controller 110.

The command generation function 120k of the unit controller 110 sets up a command transmission, such as generating a command, at the timing of sending a read command or a write command (S20). When the setup for the command transmission is completed, based on this command, the receive data amount predict/response time setting function 120h predicts a data amount of proper response to this command, and simultaneously determines a threshold value of the response time from when the command is sent to the time when the proper response is received (S21). The data amount and the threshold value of response time, which have been predicted by the receive data amount predict/response time setting function 120h, are notified to the communication error processing function 120c.

As described above, the command sent from the unit controller 110 includes a read command and a write command. When a read command is sent, it is already determined at the time of generating this read command that from which area the data is read in the memory of the memory-equipped radio communication tag. Therefore, it is possible to know the read data amount at the point of time when the read command is being generated. Furthermore, the read response associated with this read command has a data amount of five bytes, if the readout data is excluded, as described above. Therefore, the length of this read response is equal to (readout data amount+5 (five)) bytes. When a write command is sent, the data amount of the write response associated with this write command is 5 (five) bytes as described above. Therefore, the receive data predicting function 120h is allowed to predict the data amount of proper response to the command, that is, the receive data amount, at the time when the command is generated.

The threshold value of the response time of the proper response corresponds to the maximum permissible response time, and it is determined according to the communication available time between the controller unit 110 and the developing unit, communication retry number of times within this communication available time, and a type of the command sent from the unit controller 110. The communication available time between the unit controller 110 and the developing unit corresponds to a time period when the memory-equipped radio communication tag on the developing unit and the radio communication module 124 are opposed to each other. In other words, as shown in FIG. 11A, the developing unit 52 which is subjected to developing subsequent to the developing unit 51 is opposed to the photoconductor 21. For example, if the number of retry times is determined as twice in the case where communication failure occurs, it is necessary that the maximum permissible time of the response time is equal to or less than the time length which allows twice retries within this communication available time. In other words, it is necessary that the maximum permissible time of the response time has to satisfy the following relations.

MAXIMUM PERMISSIBLE TIME OF RESPONSE TIME≦COMMUNICATION AVAILABLE TIME−TIME FOR TWICE COMMUNICATION RETRIES

When the command sent from the unit controller 110 is a write command, the data amount of the write response associated with this write command is 5 (five) bytes, which is a small amount. On the other hand, when the command sent from the unit controller 110 is a read command, the data amount of the read response associated with this read command is equal to (readout data amount+five) bytes, which is a large amount. Therefore, if a read command is sent, it is preferable to make the maximum permissible response time longer than the case where a write command is sent.

In view of the situation above, in the present embodiment, if it is assumed that the communication available time between the controller unit 110 and the developing unit is 1,500 ms and the communication retry times is twice, the threshold value of response time of read response associated with a read command is set to 120 ms, and the threshold value of response time of write response associated with a write command is set to 90 ms. Here, in this example, the threshold value of the response time of the read response associated with the read command is set to 120 ms as a fixed value, but it may be increased or decreased according to expected data amount of the read response.

When the command transmission setup is completed (S20), the command generation function 120k stores the send command in the send buffer 116d (S22). Then, the send/receive function 120L starts transmitting the send command stored in the send buffer 116d to the radio communication module 124 (S23). The send/receive function 120L notifies the receive buffer management function 120f of the transmission start, and the receive buffer management function 120f clears the receive buffer 116b (S24). Here, clearing of the receive buffer 116b denotes that the position of a pointer indicating data terminal in the receive buffer 116b is moved to the position of starting end of the receive buffer 116b.

The send/receive function (response detecting means) 120L monitors from the start of command transmission, whether or not any data has been received such as response (S25). If a receipt of data such as a response is detected in the course of command transmission, it is notified to the transmission stop function 120i, and the transmission stop function 120i stops the command transmission by the send/receive function 120L, and simultaneously notifies the send buffer management function 120g of the receipt of response during the command transmission (S26). The send buffer management function 120g clears the send buffer 116d. Here, clearing of the send buffer 116d denotes that the position of the pointer indicating data terminal in the send buffer 116d is moved to the position of starting end of the send buffer 116d, as is the aforementioned case of clearing process of the receive buffer 116b. In parallel with the above operation, the send/receive function 120L stores the response having been received into the receive buffer 116b (S27). After clearing of the send buffer 116d and storing the response into the receive buffer 116b are completed, the next step is step 39 in FIG. 14. If a response is received in the course of command transmission (S25), this response is not a proper response which is associated with the command being sent, but a response due to some kind of communication failure or the like. Therefore, in order to handle such cases quickly, sending the command in the course of transmission is stopped.

In addition, if the send/receive function 120L does not receive a response during the command transmission (S25) and the command transmission is completed, the send/receive function 120L notifies the communication error processing function 120c of the completion of command transmission, and directs the communication error processing function to start time measuring (S28). This completion of command transmission is also notified to the send buffer management function 120g, and this send buffer management function 120g clears the send buffer 116d (S29). In other words, a timing for clearing the send buffer 116d is when the command transmission is stopped (S26, 27), and the command transmission is completed (S28, S29).

The command having been sent to the radio communication module 124 is transmitted wirelessly to the memory-equipped radio communication tag from this radio communication module 124 (S50, FIG. 15). In receipt of the command, the controller 54g of the memory-equipped radio communication tag (FIG. 4) analyzes this command having been transmitted, and performs a processing appropriate for the command (S51, FIG. 15). Specifically, if the command thus received is a read command, the controller reads out data from a pertinent area in the memory 54h, and transmits a read response including this data. If the command is a write command, the controller writes the write data included in the write command into a pertinent area in the memory 54h, and transmits a response indicating that writing is completed. Upon receipt of a proper response from the memory-equipped radio communication tag, the radio communication module 124 transmits this response to the unit controller 110 (S52, FIG. 14).

The send/receive function (response detecting means) 120L of the unit controller 110 monitors whether or not there is a receipt of response or the like, even after the command transmission is completed (S30). If there is no receipt of response, the send/receive function 120L waits for a receipt until the communication error processing function 120c determines that the waiting time exceeds the threshold value of response time (S31). If there is no receipt of response even after a lapse of the threshold value of response time, the operation proceeds to step 39 in FIG. 14. When a response or the like is received, the communication error processing function 120c also determines whether or not the waiting time exceeds the threshold value of response time (S32). If it exceeds the threshold value of response time, the operation proceeds to step 39 in FIG. 14. If the waiting time does not exceed the threshold value of response time, the send/receive function 120L stores in the receive buffer 116b only data portion corresponding to one byte out of the received data, and the receive buffer management function 120f moves the pointer by one byte, which indicates the data terminal position of the receive buffer 116b (S33). Accordingly, the receive buffer management function 120f is allowed to recognize the receive data amount within the receive buffer 116b. Next, the communication error processing function 120c determines whether or not the receive data amount recognized by the receive buffer management function 120f reaches the receive data amount being predicted in step 21 (S34), and if it does not reach the predicted data amount, the operation returns to step 32. After repetition of processing from step 32 to step 34 as described above, and data of predicted data amount is received within the threshold value of response time, the operation proceeds to step 36 in FIG. 14.

In step 36, the interpreting function 120j interprets data of response stored in the receive buffer 116b, and determines whether or not the leading data is a start code. If the leading data is a start code, the interpreting function 120j refers to data in a part corresponding to the last data area in the header of the communication frame, being one byte, out of the data stored in the receive buffer 116b, and determines whether or not the receive data is appropriate (S37).

As described above, BCC is stored in the last data area in the header of each of various responses that have been sent to the unit controller 110. Here, it is assumed a case that a noise is introduced into data sent from the radio module 124, due to a disconnection between the unit controller 110 and the radio communication module 124, or a temporary breakdown or the like of the radio communication module 124, and the receive data amount becomes larger than the predicted data amount. In such a case, according to the processing in S33 and S34, all of the receive data is not stored in the receive buffer 116b, and only a part of the receive data, which corresponds to the predicted data amount, is stored. In other words, only the data amount is stored, which is the same as the amount to be received in a normal case where no communication abnormality occurs. In view of this situation, the interpreting function 120j obtains exclusive OR of the data in the payload part, out of the receive data stored in the receive buffer 116b, and it is determined whether or not the receive data is appropriate, based on a judgment whether or not this exclusive OR value agrees with the data stored in the last data area in the header part.

In the case where the receive data is not appropriate and in the case where it is determined that the leading data is not a start code in step 36, the operation proceeds to step 44. On the other hand, if the receive data is appropriate, that is, it is a proper response, a scheduled processing is carried out, which is prepared for the case of proper response receipt (S38), and a series of processing is completed. It is to be noted that the scheduled processing as described above is a processing as the following: if the appropriate receive data is a proper read response, the toner remaining amount management function 120d stores the read data, that is, a toner remaining amount, out of the receive data stored in the receive buffer 116b, into the toner remaining amount storage area 116e in the RAM 116.

As thus described, it is determined whether or not a proper response has been returned for the command sent from the unit controller 110, based on whether or not all the following conditions are satisfied: a) the response is received after the command transmission is completed (judgment in S30); b) the response is received within the threshold value of response time (judgment in S32); data amount of receive data is equal to a predicted number of bytes (judgment in S34); the leading data is a start code (judgment in S36); and e) exclusive OR of the data in the payload part agrees with BCC (judgment in S37).

Next, explanation will be made for the case that the operation proceeds to step 39. If a proper response for the command cannot be received, the next step is S39. Specifically, as described above, such cases includes: a) a response is received in the course of command transmission (S25); b) no response has been received even exceeding the threshold value of response time after the command transmission is completed (S30, S31), or data is received after the command transmission is completed, but data of scheduled number of bytes has not been received within the threshold value of response time (S30, S32, S33, S34).

In step 39, the communication error processing function 120*c* determines whether or not the receive data amount recognized by the receive buffer management function 120*f* is 5 (five) bytes. The data amount of 5 (five) bytes corresponds to the data amount of the error response as explained with reference to FIG. 10. Therefore, it is only judged here whether or not there is a possibility that the receive data is an error response. If the receive data amount is not 5 (five) bytes, the operation proceeds to step 46, and if the receive data amount is five 5 (bytes), the interpreting function 120*j* interprets the data of the response stored in the receive buffer 116*b*, and determines whether or not the leading data is a start code, as in the aforementioned cases of step 36 and step 37 (S40). If the leading data is a start code, the interpreting function 120*j* refers to data in a part corresponding to the last data area in the header of the communication frame, being one byte, out of the data stored in the receive buffer 116*b*, and determines whether or not the receive data is appropriate, that is, the exclusive OR of the payload in the communication frame agrees with BCC (S41). If it agrees with BCC, the operation proceeds to step 42. On the other hand, in the case where it does not agree with BCC and in the case where it is determined that the leading data is not a start code according to the judgment in step 40, the operation proceeds to step 44.

In the case where the receive data amount is 5 (five) bytes (S39), the leading data is a start code (S40), and the exclusive OR of the payload agrees with BCC (S41), this response is determined as a proper error response, not a proper response for the transmission command, and the operation proceeds to step 42 as described above.

In step 42, step 44, and step 46, the communication error processing function 120*c* determines whether or not a predetermined number of communication retries (here, twice) have been completed. If it has not been completed yet, the operation returns to step 20, and the communication retry is executed. If communication retries of a predetermined number of times have been completed, in any of the above cases, a message prompting to call a service person is displayed (S43, S45, S47) on the display unit 95 (FIG. 4), and the communication operation is terminated. If the operation goes through step 39, 40, 41, and 42, up to step S43, this operation flow indicates that the communication error processing function 120*c* receives a proper error response from the radio communication module 124. Therefore, the communication error processing function stores in the error description storage area 116*g* in the RAM 116 a status that an error response has been received. If the operation goes through step 44 up to step 45, this operation flow indicates that the exclusive OR of the payload does not agree with BCC or the leading data is not a start code. Therefore, the communication error processing function stores in the error description storage area 116*g* in the RAM 116 a status that data is incorrect. If the operation goes through step 46 up to step 47, the communication error processing function stores in the error description storage area 116*g* in the RAM 116 a status of no response.

When a service person visits for checking, the data stored in the error description storage area 116*g* in the RAM 116 is referred to, so as to find a cause of communication failure.

When the operation returns to step 20 to execute the communication retry, the communication error processing function 120*c* informs the command generation function 120*k* that this procedure is a retry. When the command generation function 120*k* receives that this procedure is a retry, a previous command stored in the command storage area 116*i* in advance is read out, and a process of command transmission is set up (S20). Subsequently, also in the case of communication retry, the same processing operations as described above will be performed.

Next, with reference to the sequence diagram in FIG. 16 and the timing chart in FIG. 17, a processing will be explained once again in the case where a response is received in the course of command transmission.

When a communication of command is started (S23) the receive buffer 116*b* is cleared (S24). This clearing allows a receipt of a response from the start of a command transmission. If a noise is introduced into the command whose transmission is being started (S55), and for instance, the number of data items written into the command header (FIG. 9A, FIG. 9B) goes down, the radio communication module 124 falsely recognizes that all the data items of the command have already been received, due to the number of data items written in the command header, even if it is still in the course of command receiving. Therefore, if data receiving continues more, it is determined as a communication error. Accordingly, the radio communication module 124 transmits an error command to the unit controller 110, in the course of data receiving, in other words, in the course of command transmission from the unit controller 110 (S56)

If the unit controller 110 receives a response of some kind during the command transmission (S25), this operation indicates that the response is not a proper response to the command in the course of transmission, but a response due to a fault of some kind such as communication failure, as described above. Therefore, sending the command in the course of transmission is stopped so as to handle such faulty situation quickly (S26). Then, this response is stored in the receive buffer 116*b* (S27), subsequently interpreted, and then a communication retry is executed (S42, 43). Therefore, if a response is received during the command transmission, the communication retry can be executed immediately.

Effects of the Embodiments

As thus described, in the present embodiment, if a response is received during a command transmission from the unit controller 110, this sending process is stopped, and communication is retried quickly. Many times of communication retries can be performed during the short communication available time while the radio communication tags 51*a*, 52*a*, 53*a*, and 54*a* mounted on the developing units 51, 52, 53, and 54, respectively, are opposed to the radio communication module 124.

In the present embodiment, even if a noise is introduced into the communication data between the unit controller and each unit, and data amount from the unit side is increased, the receive buffer 116*b* in the unit controller 110 only stores data corresponding to the predicted number of bytes. Therefore, it is possible to avoid a hung-up status caused by storing data exceeding the assumption, into the receive buffer 116*b*.

Furthermore, in the present embodiment, after the unit controller 110 sends a command, if a response thereto cannot be received within a predetermined period of time, an error processing is executed. Therefore, it is also possible to avoid a hung-up due to a response waiting.

<Other Applications of the Present Invention>

In the present embodiments as described above, a communication between the photoconductor unit 20 and each unit of the developing units 51, 52, 53, and 54, and the unit controller 110 is taken as an example. However, it is also possible to mount a memory-equipped radio communication tag on another unit, such as units 40, 60, 80, and 95, and the present invention may be applied to the communication with those tags.

In addition, the embodiment described above is directed to a color laser beam printer as one example of image forming apparatus. However, the present invention is not limited to the printer, and it may be applied to another type of image forming apparatus, such as facsimile machine, and copying machine, for instance.

What is claimed is:

1. An image forming apparatus comprising a unit and a controller which controls the unit, and the apparatus performing data sending and receiving between the unit and the controller, wherein,
    said controller comprises,
    a receive data amount predicting means which predicts, based on a command sent from said controller to said unit side, a data amount of a response from the unit side for the command having been sent,
    a receive buffer which temporarily stores data from said unit side, and
    a buffer management means which stores the data from said unit side sequentially in the receive buffer, and does not store in the receive buffer, a portion of the data from the unit side, the portion exceeding the data amount having been predicted.

2. The image forming apparatus according to claim 1, wherein,
    a predetermined area within a communication frame constituting said response contains verification data of at least one part of the data within the communication frame, and
    the apparatus comprises a data judging means which determines whether or not the data stored in said receive buffer is an appropriate response, based on the data stored in a position corresponding to said predetermined area within said communication frame, out of the data stored in said receive buffer.

3. The image forming apparatus according to claim 2, further comprising a retry means which resends said command having been sent, when said data judging means determines that the data stored in said receive buffer is not an appropriate response.

4. The image forming apparatus according to claim 1, further comprising a controller side radio communication means which establishes wired connection with said controller and performs wired communication with the controller, wherein,
    said unit comprises a memory-equipped radio communication device which performs radio communication with said controller side radio communication means, and
    said memory-equipped radio communication device comprises,
    a radio communication means which performs radio communication with said controller side radio communication means,
    a memory in which data is stored, and
    a control means which writes data into the memory or reads data from the memory, according to a description of the radio communication by the controller-side communication means.

5. The image forming apparatus according to claim 4, wherein,
    said unit is a unit attachable to/detachable from a casing of the image forming apparatus.

6. An image forming apparatus comprising a unit and a controller which controls the unit, the image forming apparatus sending and receiving data between the unit and the controller, wherein,
    said controller comprises,
    a receive data amount predicting means which predicts, based on a command sent from said controller to said unit side, a data amount of a response from the unit side for the command having been sent,
    a receive data amount measuring means which measures the data amount from said unit side, and
    a communication error processing means which performs communication error processing when the data amount measured by said receive data amount measuring means does not agree with the data amount predicted by said receive data amount predicting means within a predetermined period of time.

7. The image forming apparatus according to claim 6, wherein,
    said communication error processing means comprises a retry means which resends said command having been sent.

8. The image forming apparatus according to claim 7, wherein,
    said predetermined period of time is a period assuring retrying for predetermined number of counts by said retry means, within a communication available period between the apparatus and a destination of said command having been sent.

9. The image forming apparatus according to claim 6, comprising,
    a response time setting means which determines said predetermined period of time according to a description of said command having been sent.

10. The image forming apparatus according to claim 6, comprising,
    a receive buffer which temporarily stores data from said unit side, and
    a buffer managing means which stores data from said unit side sequentially in the receive buffer, and does not store a portion of the data which exceeds the predicted data amount.

11. The image forming apparatus according to claim 10, wherein,
    a predetermined area within a communication frame constituting said response contains verification data of at least one part of the data within the communication frame, and
    the apparatus comprises a data judging means which determines whether or not the data stored in said receive buffer is an appropriate response, based on the data stored in a position corresponding to said predetermined area within said communication frame, out of the data stored in said receive buffer.

12. The image forming apparatus according to claim 11, further comprising a retry means which resends said command having been sent, when said data judging means determines that the data stored in said receive buffer is not an appropriate response.

13. The image forming apparatus according to claim 6, further comprising a controller side radio communication means which establishes wired connection with said controller and performs wired communication with the controller, wherein,
said unit comprises a memory-equipped radio communication device which performs radio communication with said controller side radio communication means, and
said memory-equipped radio communication device comprises,
a radio communication means which performs radio communication with said controller side radio communication means,
a memory in which data is stored, and
a control means which writes data into the memory or reads data from the memory, according to a description of the radio communication by the controller-side radio communication means.

14. The image forming apparatus according to claim 13, wherein,
said unit is a unit attachable to/detachable from a casing of the image forming apparatus.

15. An image forming apparatus comprising a unit and a controller which controls the unit, and in the image forming apparatus, only after a command is sent from the controller, verifying a proper response is sent from the unit side for the command, wherein
said controller comprises,
a response detecting means which detects a receipt of a response from said unit side, and
a transmission stop means which stops sending the command when the receipt of said response is detected by said response detecting means during transmission of said command.

16. The image forming apparatus according to claim 15, wherein,
said controller comprises,
a receive buffer which temporarily stores a response sent from said unit side,
an interpreting means which interprets the response stored in said receive buffer, and
a handling means which performs a processing according to said response which is interpreted by said interpreting means, when the command transmission is stopped by said transmission stop means.

17. The image forming apparatus according to claim 16, wherein,
said handling means comprises a communication error processing means which resends said command.

18. The image forming apparatus according to claim 16, wherein,
said response detecting means starts detecting whether or not a response has been received from the time when transmission of said command is started.

19. The image forming apparatus according to claim 16, wherein,
said controller comprises a receive buffer management means which clears said receive buffer at the time when transmission of said command is started.

20. The image forming apparatus according to claim 16, wherein,
said controller comprises,
a receive data amount predicting means which predicts, based on a command from said controller to said unit side, a data amount of a proper response from the unit side to the command, and
a receive data amount measuring means which measures a data amount from said unit side, wherein,
said handling means further comprises,
a communication error processing means which resends said command, when the data amount measured by said receive data amount measuring means does not agree with the data amount predicted by said receive data amount predicting means within a predetermined period of time.

21. The image forming apparatus according to claim 20, wherein,
said controller comprises a response time setting means which determines said predetermined period of time according to a description of said command.

22. The image forming apparatus according to claim 20, wherein,
said controller comprises a receive buffer managing means which stores a response from said unit side sequentially in said receive buffer, and does not store in said receive buffer a portion of the data in the response from the unit side, the portion exceeding the data amount predicted by said receive data amount predicting means.

23. The image forming apparatus according to claim 16, wherein,
a predetermined area within a communication frame constituting said response contains verification data of at least one part of the data within the communication frame, and
said interpreting means determines whether or not the data stored in said receive buffer is an appropriate response, based on the data stored in a position corresponding to said predetermined area within said communication frame, out of the data of said response stored in said receive buffer, and
said handling means comprises a communication error processing means which resends said command, when said interpreting means determines that the data stored in said receive buffer is not an appropriate response.

24. The image forming apparatus according to claim 15, further comprising a controller side radio communication means which establishes wired connection with said controller and performs wired communication with the controller, wherein,
said unit comprises a memory-equipped radio communication device which performs radio communication with said controller side radio communication means, and
said memory-equipped radio communication device comprises,
a radio communication means which performs radio communication with said controller side radio communication means,
a memory in which data is stored, and
a control means which writes data into the memory or reads data from the memory, according to a description of the radio communication by the controller-side radio communication means.

25. The image forming apparatus according to claim 24, wherein,
said unit is a unit attachable to/detachable from a casing of the image forming apparatus.

26. A communication data handling method in an image forming apparatus comprising a unit and a controller which controls the unit, and the apparatus performing data sending and receiving between the unit and the controller, wherein,
said controller predicts, based on a command sent from said controller to said unit side, a data amount of a response from the unit side for the command having been sent, stores data from said unit side sequentially, in a receive buffer, and does not store in the receive buffer, a portion of the data from the unit side, the portion exceeding the data amount having been predicted.

27. A communication data handling method in an image forming apparatus comprising a unit and a controller to control the unit, the image forming apparatus performing data sending and receiving between the unit and the controller, wherein, said controller predicts, based on a command sent from said controller to said unit side, a data amount of a response from the unit side for the command having been sent, measures the data amount of said response from said unit side, and performs communication error processing when the measured data amount of said response does not agree with the predicted data amount within a predetermined period of time.

28. A communication data handling method of an image forming apparatus comprising a unit and a controller which controls the unit, and in the image forming apparatus, verifying a proper response is sent from the unit side for a command, only after the command is sent from the unit, the method comprising, a response detecting step which detects a receipt of the response from said unit side, a transmission stop step which stops sending said command when said response detecting step detects the receipt of the response during transmission of said command, an interpreting step which interprets said response, and a handling step which performs a process according to said response which has been interpreted in said interpreting step, when the transmission of said command is stopped by said transmission stop step.

* * * * *